United States Patent [19]
Cass

[11] Patent Number: 5,692,073
[45] Date of Patent: Nov. 25, 1997

[54] FORMLESS FORMS AND PAPER WEB USING A REFERENCE-BASED MARK EXTRACTION TECHNIQUE

[75] Inventor: Todd A. Cass, San Francisco, Calif.

[73] Assignee: Xerox Corporation, Stamford, Conn.

[21] Appl. No.: 688,704

[22] Filed: Jul. 30, 1996

Related U.S. Application Data

[60] Provisional application No. 60/016,810, May 3, 1996.

[51] Int. Cl.⁶ .................................. G06K 9/00; H04N 1/32
[52] U.S. Cl. .......................... 382/219; 382/317; 358/468
[58] Field of Search ........................ 382/219, 221, 382/222, 317, 218, 294, 283, 282, 217; 358/468, 453, 448; 235/375; 397/766, 773, 804, 793

[56] References Cited

U.S. PATENT DOCUMENTS

| | | | |
|---|---|---|---|
| 4,542,378 | 9/1985 | Suganuma et al. | |
| 4,893,333 | 1/1990 | Baran et al. | 358/468 |
| 5,020,123 | 5/1991 | Thompson | 382/287 |
| 5,060,980 | 10/1991 | Johnson et al. | |
| 5,140,650 | 8/1992 | Casey et al. | 382/283 |
| 5,201,011 | 4/1993 | Bloomberg et al. | 382/282 |
| 5,274,468 | 12/1993 | Ojha | 358/448 |
| 5,282,052 | 1/1994 | Johnson et al. | 382/317 |
| 5,317,646 | 5/1994 | Sang, Jr. et al. | 382/217 |
| 5,386,298 | 1/1995 | Bronnenberg et al. | 382/317 |
| 5,416,849 | 5/1995 | Huang | 382/317 |
| 5,418,865 | 5/1995 | Bloomberg | 382/317 |
| 5,428,694 | 6/1995 | Betts et al. | 382/317 |
| 5,455,898 | 10/1995 | Mahoney et al. | |
| 5,465,167 | 11/1995 | Cooper et al. | 358/468 |
| 5,486,686 | 1/1996 | Zdybel, Jr. et al. | 235/375 |
| 5,495,581 | 2/1996 | Tysai | 395/776 |

OTHER PUBLICATIONS

Using Paperworks from a Fax Machine (User's Manual), Xerox Corp., 1992.

William J. Rucklidge, "Locating Objects Using the Hausdorff Distance", *Proceedings of the Fifth International Conference on Computer Vision (IEEE)*, Jun. 1995, pp. 457–464.

Huttenlocher and William J. Rucklidge, "A Multi-Resolution Technique for Comparing Images Using the Hausdorff Distance", *Proceedings Computer Vision and Pattern Recognition '93 (IEEE)*, Jun. 1993, pp. 705–706.

William J. Rucklidge, "Efficient Computation of the Minimum Hausdorff Distance for Visual Recognition", Ph.D. Dissertation, Cornell University, Jan. 1995.

(List continued on next page.)

*Primary Examiner*—Scott A. Rogers

[57] ABSTRACT

A processor is provided with first and second document images. The first image represents an instance of a reference document to which instance a mark has been added. The second image is selected from among a collection of document images and represents the reference document without the mark. The processor automatically extracts from the first document image a set of pixels representing the mark. This is done by performing a reference-based mark extraction technique in which the second document image serves as a reference image and in which substantially the entirety of the first document image is compared with substantially the entirety of the second document image. Also, the processor is provided with information about a set of active elements of the reference document. The reference document has at least one such active element and each active element is associated with at least one action. The processor interprets the extracted set of pixels representing the mark by determining whether the mark indicates any of the active elements of the reference document. If the mark indicates an active element, the processor facilitates the action with which the indicated active element is associated.

20 Claims, 21 Drawing Sheets

OTHER PUBLICATIONS

D. P. Huttenlocher, J. J. Noh and W. J. Rucklidge, "Tracking Non-Rigid Objects in Complex Scenes", *Proceedings of the Fourth International Conference on Computer Vision (IEEE)*, May 1993, pp. 93–101.

C. E. Jacobs, A. Finkelstein and D. H. Salesin, "Fast Multiresolution Image Querying", *Proceedings of SIGGRAPH '95*, Aug. 1995, pp. 277–286.

Yasuhito Suenaga and Mazakazu Nagura, "A Facsimile Based Manuscript Layout and Editing System by Auxiliary Mark Recognition", *Proceedings of the Fifth International Conference on Pattern Recognition, (IEEE)*, Dec. 1980, pp. 856–858.

Yasuhito Suenaga, "Some Techniques for Document and Image Preparation", *Systems and Computers in Japan*, vol. 17, No. 3, 1986, pp. 35–46.

M. Worring, R. van den Boomgaard and A. W.M. Smeulders, "Hyperdocument Generation using OCR and Icon Detection", *Proceedings of the Third International Conference on Document Analysis and Recognition (IEEE)*, Aug. 1995, pp. 1180–1183.

S. Satoh, A. Takasu and E. Katsura, "An Automated Generation of Electronic Library based on Document Image Understanding", *Proceedings of the Third International Conference on Document Analysis and Recognition (IEEE)*, Aug., 1995, pp. 163–166.

G.A. Story, L. O'Gorman, D. Fox, L.L. Schaper and H.V. Jagadish, "The Right Pages Image-Based Electronic Library for Alerting and Browsing", *IEEE Computer*, Sep. 1992, pp. 17–26.

Jonathan J. Hull, "Document Image Matching and Retrieval with Multiple Distortion-Invariant Descriptors", *Proceedings of DAS '94, Kaiserlautern, Germany*, Oct. 1994, pp. 383–399.

Mark Peairs, "Iconic Paper", *Proceedings of the Third International Conference on Document Analysis and Recognition (IEEE)*, Aug. 1995, pp. 1174–1179.

Lisa Nadile, "Fax on demand hits Web", PC Week, Sep. 4, 1995, p. 16.

"SmartPaper Brochure," Xerox Corporation Desktop Document Systems, Palo Alto, CA (1994). Obtained on May 8, 1996 from Internet World Wide Web page http://www.xerox.com/Products/Smart/Paper/brochure.html.

"SmartPaper Technical Overview," Xerox Corporation Desktop Document Systems, Palo Alto, CA (1994). Obtained on May 8, 1996 from Internet World Wide Web page http://www.xerox.com/Products/SmartPaper/whtp-pr.html.

"A Look at Documents", Atlantic Document Services, Hockessin, DE. Obtained on May 8, 1996 from Internet World Wide Web page http://www.adocs.com/documents.html.

"Fuji Xerox Develops Compound Machine with Database Functions," Nikkan Kogyo Shimbun, Japan, Jan. 18, 1996, p. 10 (in English).

"World Leaders in Information-on-Demand Technology" (Ibex Technologies home page), Ibex Technologies, Inc., El Dorado Hills, CA. Obtained on May 8, 1996 from Internet World Wide Web page http://www.ibex.com/.

"Ibex Fax-From-Web," Ibex Technologies, Inc., El Dorado Hills, CA. Obtained on May 8, 1996 from Internet World Wide Web page http:/www.ibex.com/ffweb.html.

"Fax-From-Web Frequently Asked Questions," Ibex Technologies, Inc., El Dorado Hills, CA. Obtained on May 8, 1996 from Internet World Wide Web page http://www.ibex.com/ffwebfaq.html.

"Global Data Capture Solutions", Cardiff Software Inc. (Product Brochure).

"TELEform—The Number One Forms Processing Solution", Cardiff Software Inc. (Product Brochure).

David Braue, "Timesheet Pays Off", *PCWEEK*, Sep. 20, 1995.

S. Jae Yang, "Teleform for Windows", *PC Computing*, Dec. 1995.

Russ Adams, "A Matter of Recognition", *Automatic I.D. News*, Sep. 1995.

Karen Watterson, "Fax Smarter", *Windows Sources*, Jul. 1995.

Daniel P. Huttenlocher and Klara Kedem, "Computing the Minimum Hasdorff Distance for Point Sets Under Translation," *ACM Symposium on Computational Geometry*, ACM Press ISBN 0-89791-362-0, pp. 349–359.

FIG. 10

*A focus on context sensitivity and the spatial arrangement of computers*

An Overview of the
PARCTAB Ubiquitous Computing Experiment

ROY WANT, BILL N. SCHILIT, NORMAN I. ADAMS, RICH GOLD,
KARIN PETERSEN, DAVID GOLDBERG, JOHN R. ELLIS, AND MARK WEISER

FIG. 11

*A focus on context sensitivity and the spatial arrangement of computers*

An Overview of the
PARCTAB Ubiquitous Computing Experiment

ROY WANT, BILL N. SCHILIT, NORMAN I. ADAMS, RICH GOLD,
KARIN PETERSEN, DAVID GOLDBERG, JOHN R. ELLIS, AND MARK WEISER

FIG. 12

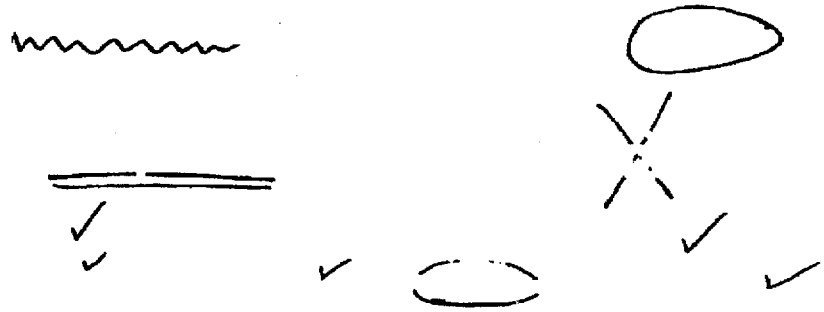

The Electronic Frontier Foundation

A non-profit civil liberties public interest organization working to protect freedom of expression, privacy, and access to online resources and information.

Information About EFF

Latest EFF Newsletter

Click This Button to Change the World:

EFF Services & Forums

- EFF Document & File Archives - the EFF Web, Gopher, FTP and WAIS Online Library
- EFF Action Alerts
- the EFF Virtual World Tour of Cyberspace project, featuring Aerosmith
- EFF News and Discussion via Usenet

EFF Publications & Other Material

- EFF's *Extended Guide to the Internet* - EEGtI
- EFFector Online EFF Newsletter - Backissues & Index
- Other Publications and Material of Interest

EFF Board & Staff Homepages

Other Interesting Internet Sites & Resources

Please send any questions or comments to *webmaster@eff.org*

FIG.20

FORMLESS FORMS AND PAPER WEB USING A REFERENCE-BASED MARK EXTRACTION TECHNIQUE

PRIORITY APPLICATION

Priority is claimed from a U.S. provisional application Ser. No. 60/016,810 filed May 3, 1996 by the same inventor and assignee.

RELATED APPLICATIONS

The following copending, coassigned U.S. patent application is related to this case: U.S. patent application Ser. No. 08/426,354, entitled "ACTIVE AREA IDENTIFICATION ON A MACHINE READABLE FORM USING FORM LANDMARKS."

BACKGROUND OF THE INVENTION

The present invention relates to user interfaces for computers and information processing systems and networks, and more particularly to paper-based user interfaces.

As is well known, the user interface is the gateway through which a human user communicates with a computer, computer network, or other system for processing digital information. For example, a desktop personal computer's user interface can include a keyboard, a mouse or other pointing device, and a display screen, coupled with appropriate software such as a command-line interface or a window-and-icon or other graphical user interface (GUI).

As is also well known, it is now commonplace for computers, printers, optical scanners, and other devices, such as multifunction devices (standalone devices that offer a combination of printing, copying, scanning, and facsimile functions), to be connected to and through local-area and wide-area computer networks. For example, this text is being written on a personal computer that is connected through a local-area network to a server computer, which controls the hard disk drive where the text will be stored, and also to several printers, on which the text can be printed, as well as to an Internet gateway server, which connects the personal computer with the Internet. The same local-area network can further accomodate a scanner or a multifunction device having a scanning capability, so that paper documents or portions thereof can be scanned and converted (as by optical character recognition software) to useable form, and then sent to the personal computer for editing or other processing.

The widespread availability of optical scanners, facsimile (fax) machines, multifunction devices, and other devices and subsystems by which computers and computer networks can "read" paper documents gives rise to the concept of a paper-based user interface. A paper-based user interface allows the user of a computer, computer network, or other digital information processing system to communicate with the system simply by making a mark or marks on a paper document or documents and then scanning the document thus marked into the system via a scanner, fax machine, multifunction device, or the like. The system can communicate back with the user by printing another document.

Paper-based user interfaces are known, if not yet commonplace. In particular, an exemplary paper-based user interface is known that allows a personal computer to receive and respond to user commands sent remotely from a distant facsimile machine. The user is provided with a blank form that has been printed on paper. The user fills out the form by making marks (as with a pen or pencil) in specific designated fields on the form. For example, the user can enter a check-mark or an X in a blank box on the form. Then the user sends a facsimile of the form thus marked to the personal computer. The personal computer receives the facsimile transmission, for example, through a modem, and so is provided with a facsimile copy of the user's marked-up form. The personal computer can then interpret the marks on the form by running image processing and other special software for this purpose, and can respond to the marks accordingly by carrying out commands that correspond to the particular boxes the user has marked. For example, the personal computer can retrieve an electronically stored document that the user has requested and send this document to the user by return facsimile. Thus the user and the computer "fax" each other in much the same way that two human beings can communicate by sending facscimiles back and forth to one another.

A paper-based user interface can serve as a complement or substitute for the more conventional keyboard-mouse-display type of user interface mentioned earlier. A paper-based user interface is particularly appealing when the user interacts with a computer network directly through a multifunction device, without recourse to a personal computer or workstation. In this situation, the user can initiate a number of functions, such as document copying, facsimile, electronic mail, document storage, and search using a simple paper form as an interface. The multifunction device "reads" what is on the form and responds accordingly, possibly with help from the network.

Paper-based user interfaces typically require that forms be created in advance, either by the user with a form editor or automatically by computer, so that the receiving computer can readily determine whether and where a given form has been marked by the user. For example, suppose that a particular form contains a set of blank boxes in which the user can enter check-marks or Xs to indicate certain requests. The user selects the form, checks some of the boxes, scans the form into the system to produce a digital image, and transmits this image (more precisely, transmits data representing the image) to a computer. Upon receiving the transmitted image of the user's marked-up form, the computer compares the image with a stored representation of the unmarked form. Based on the results of the comparison, the computer can tell what the user has requested and take any action appropriate in response. In order to make the comparison, however, the computer must first have the information necessary to interpret the form, such as information about where the blank boxes are located on the form, how big the boxes are, and what each box means, that is, how the computer should respond when certain boxes are marked. This information can be provided to the computer either in advance of the user's transmission, or concurrently with or as part of the user's transmission. For example, the computer can be given access to a set of stored digital representations each indicating the layout or appearance of one of a set of forms, and the user can transmit along with the marked-up form image an identification number that uniquely corresponds to the particular type of form being used. As another example, specially coded information, such as a pattern of data glyphs or a bar code, can be included in the form itself to indicate the layout of the blank fields in the form. The computer can be programmed in this case to seek the coded information at a predesignated location within the received image, and to use the coded information together with additional (stored or preprogrammed) information to identify what kind of form has been sent and to determine what is to be done in response to the boxes checked by the user.

Known paper-based user interfaces are greatly limited in the possible appearance and layout of forms they support. More particularly, the forms have been limited to whatever can be readily constructed with a forms editor or automatic forms generation program, and the active elements of the forms have been restricted to very simple graphical elements such as check boxes, open circles or ovals, rectangular blank spaces, blank lines, and the like. An example of a form used in a paper-based user interface in the prior art is seen in FIG. 1, which is a Universal Send Form from the PaperWorks software product formerly available from Xerox Corporation (Stamford, Conn.). The form includes check boxes such as check boxes 1 and blank rectangles such as rectangles 2, as well as data glyphs 3 that are used by the computer to help it interpret the form.

The range of application of paper-based user interfaces has therefore been limited. If the potential of these interfaces is to be fully realized, a more flexible and powerful way to create forms is needed.

SUMMARY OF THE INVENTION

The present invention offers a new approach to computer-readable forms, wherein arbitrary documents can be used as forms. This approach can be called formless forms. According to the invention, a stored digital document of almost any kind can be used as a form for a paper-based user interface, even if the document was not originally designed or intended for use as a form. For example, a document containing an arbitrary combination of text, graphics, and bitmap images can be used, and any area of the document can become an active region or field of the form. Formless forms offer new flexibility when applied in existing paper-based user interfaces, and also can provide new applications for paper-based user interfaces. One such application is in a paper-based World Wide Web user interface, here called PaperWeb.

One aspect of the invention concerns a method in which a processor is provided with first and second document images. The first image represents an instance of a reference document to which instance a mark has been added. The second image is selected from among a collection of document images and represents the reference document without the mark. The processor automatically extracts from the first document image a set of pixels representing the mark. This is done by performing a reference-based mark extraction technique in which the second document image serves as a reference image and in which substantially the entirety of the first document image is compared with substantially the entirety of the second document image. Also, the processor is provided with information about a set of active elements of the reference document. The reference document has at least one such active element and each active element is associated with at least one action. The processor interprets the extracted set of pixels representing the mark by determining whether the mark indicates any of the active elements of the reference document. If the mark indicates an active element, the processor facilitates the action with which the indicated active element is associated.

Another aspect of the invention concerns a method in which a digital scanning device scans a hardcopy instance of a first document to produce a first document image. The hardcopy instance is an instance of a reference hypertext document document to which instance a mark has been added. The reference hypertext document has an associated set of active elements, each associated with at least one action. A processor is provided with the first document image and also with a second document that is selected from among a plurality of document images and that represents the reference document without the mark. The processor is further provided with the set of active elements for the reference hypertext document. The processor automatically extracts from the first document image a set of pixels representing the mark. This is done by performing a reference-based mark extraction technique in which the second document image serves as a reference image and in which substantially the entirety of the first document image is compared with substantially the entirety of the second document image. The processor interprets the extracted set of pixels representing the mark by determining whether the mark indicates any of the active elements of the reference document. If the mark indicates an active element, the processor facilitates the action with which the indicated active element is associated.

The invention will be better understood with reference to the drawings and detailed description below. In the drawings, like reference numerals indicate like components.

BRIEF DESCRIPTION OF THE DRAWINGS

FIGS. 10–12 are a series of views that illustrate mark extraction for a test image;

FIG. 20 is an example of a marked-up World Wide Web page printout that can be used as input to Paper Web;

DETAILED DESCRIPTION OF SPECIFIC EMBODIMENTS

Overview

A paper-based user interface (PUI) provides a user interface to a computer, computer network, or other computational or information processing system in which a paper (or other hardcopy) document instance is marked up by a user, scanned into the system, and interpreted by the system in order to control some computational process. Formless Forms makes it possible to use arbitrary documents, rather than specially designed forms, as the basis for a PUI. Paper Web applies Formless Forms PUI technology to provide a new kind of browser for the World Wide Web and other hypertext databases.

According to the invention, an ordinary paper document can become, in effect, a "form"; that is, it can be made recognizable by a PUI and used to control arbitrary computational processes. Associative links can be established between graphical or other compositional elements of a document and computational processes to be controlled. Any textual, graphic, photographic, or other compositional element of the document can be made computationally active (that is, can be treated as a cue to trigger an arbitrary computation or computations). For example, with Formless Forms, a character, a word, or a graphical element can be marked by the user and the computer will respond by carrying out an action or actions associated with the marked item. Notably, the computer need not recognize the marked character, word, or graphical element as such in order to carry out the actions associated with the marked element. That is, the computer need not perform optical character recognition (OCR), word recognition, linguistic analysis, pattern recognition, or other symbolic processing. Instead, the computer can perform its processing in the image domain, using image processing techniques to distinguish (extract) the marks from the original marked document and thus to determine where the user has marked the document and which elements of the document are indicated. The computer can then readily determine whether and what computational processes are associated with the indicated elements, and respond accordingly.

In short, with Formless Forms, a computer can respond to a mark made on a document that was never intended for use as a form in the same way as if the user had marked a check box on a conventional form. Moreover, the computer can do this without symbolic reasoning and without recognizing the semantic content of the document.

System Components

Figure 2:
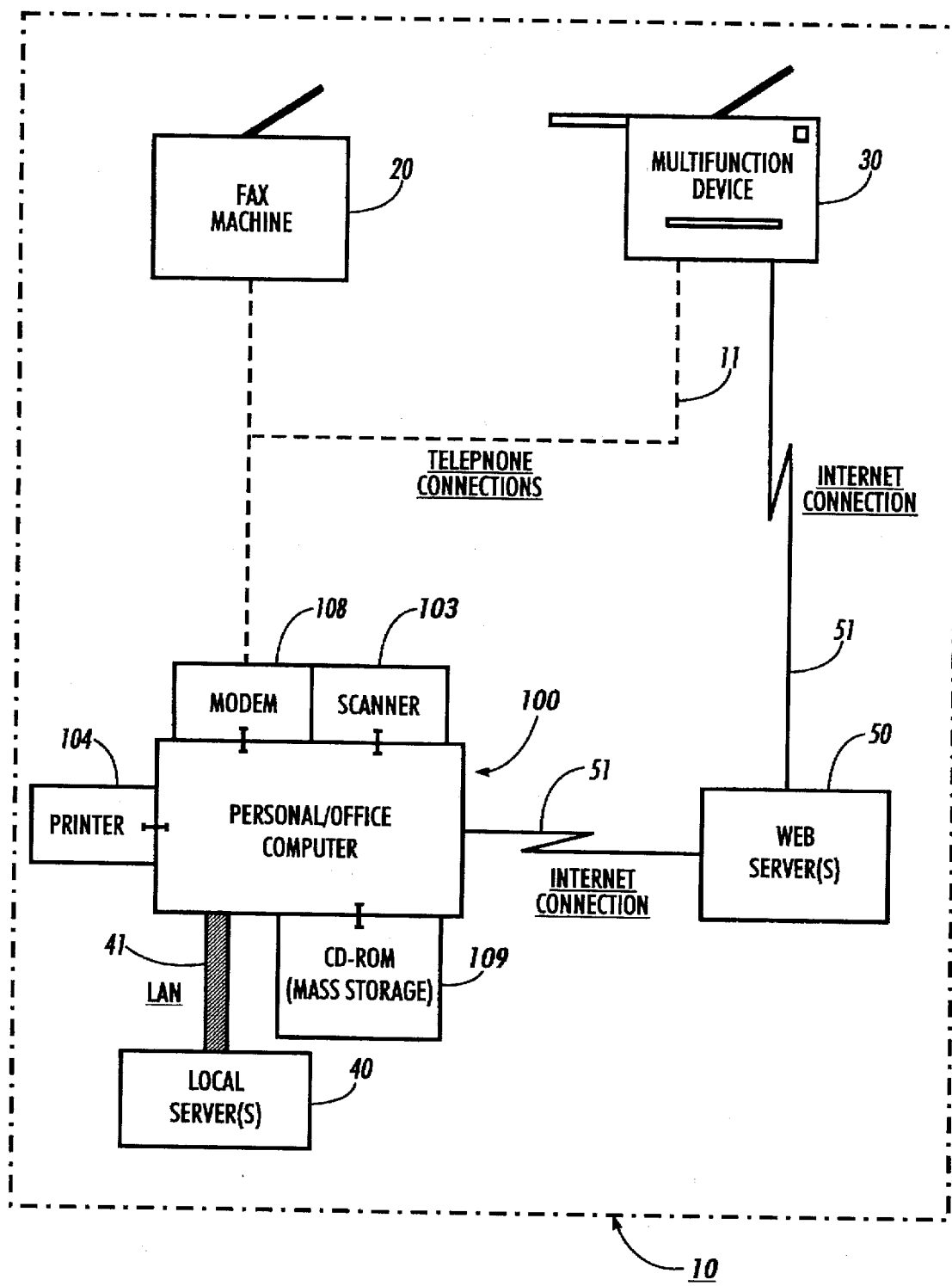
FIG. 2 schematically depicts the components of a system suitable to an embodiment of the present invention.

FIG. 2 schematically depicts an example of a computational system 10 suitable to an embodiment of the system and method of the invention. System 10 includes a fax machine 20, a "smart" multifunction device 30 (that is, a multifunction device incorporating a processor (CPU) and memory), a personal or office computer 100, one or more local server computers 40, and one or more World Wide Web server computers 50. These are connected by various communications pathways including telephone connections 11, a local area network 41, and the Internet 51. Computer 100 includes a modem 108 and optionally a CD-ROM mass storage device 109, and has attached peripherals including an optical scanner 103 and a printer 104.

Persons of skill in the art will appreciate that the design of system 10 is intended to be illustrative, not restrictive. In particular, it will be appreciated that a wide variety of computational, communications, and information and document processing devices can be used in place or or in addition to the devices 20, 30, 40, 50, and 100 shown in system 10. Indeed, connections through the Internet 51 generally involve packet switching by intermediate router computers (not shown), and computer 100 is likely to access any number of Web servers 50 during a typical Web browsing session. Also, the devices of system 10 can be connected in different ways. For example, printer 104 is shown as being an attached peripheral of computer 100, but it could also be a networked printer, accessed via local area network 41 through a print server that is one of the local servers 40.

The various communication pathways 11, 41, 51 in system 10 allow the devices 20, 30, 40, 50, 100 to communicate with one another. Telephone connections 11 allow fax machine 20 to communicate with multifunction device 30, and also with computer 100 by way of modem 108. Local area network 41 allows computer 100 to communicate with local server(s) 40. The Internet 51 allows multifunction device 30 and computer 100 to communicate with Web server(s) 50.

A wide variety of possibilities exists for the relative physical locations of the devices in system 10. For example, fax machine 20 and multifunction device 30 can be in the same building as each other or around the globe from one another, and either or both can be in the same building as computer 100 or around the globe from computer 100. Web server(s) 50 can likewise be at local (so-called "Intranet") or remote sites with respect to computer 100 and multifunction device 30. The distance between computer 100 and local server(s) 40, of course, is limited by the technology of local area network 41.

A user or users can access system 10 at various points and in various ways. For example, a user can provide inputs to and receive outputs from system 10 through fax machine 20, through multifunction device 30, or through the scanner 103 and printer 104 of computer 100. In particular, a user who is near fax machine 20 can send a fax from fax machine 20 to computer 100, and computer 100 (assumed here to be suitably programmed with Formless Forms PUI software) can automatically send a fax back to the user at fax machine 20. Similarly, the user can send a fax from fax machine 20 to multifunction device 30 and multifunction device 30 (likewise assumed to be suitably programmed) can automatically send a fax back to the user at fax machine 20. A user who is near computer 100 can interact with computer 100 through its PUI in conjunction with scanner 103 and printer 104. A user who is near multifunction device 30 can interact with multifunction device 30 through its scanning and printing capabilities, thereby using multifunction 30 as a kind of personal computer, a computer having a user interface that is primarily or even exclusively paper-based. Finally, the user can interact with Web server(s) 50 by browsing the Web. This can be done directly from computer 100 or multifunction device 30, or indirectly from fax machine 20 by way of either computer 100 or multifunction device 30.

Figure 3:
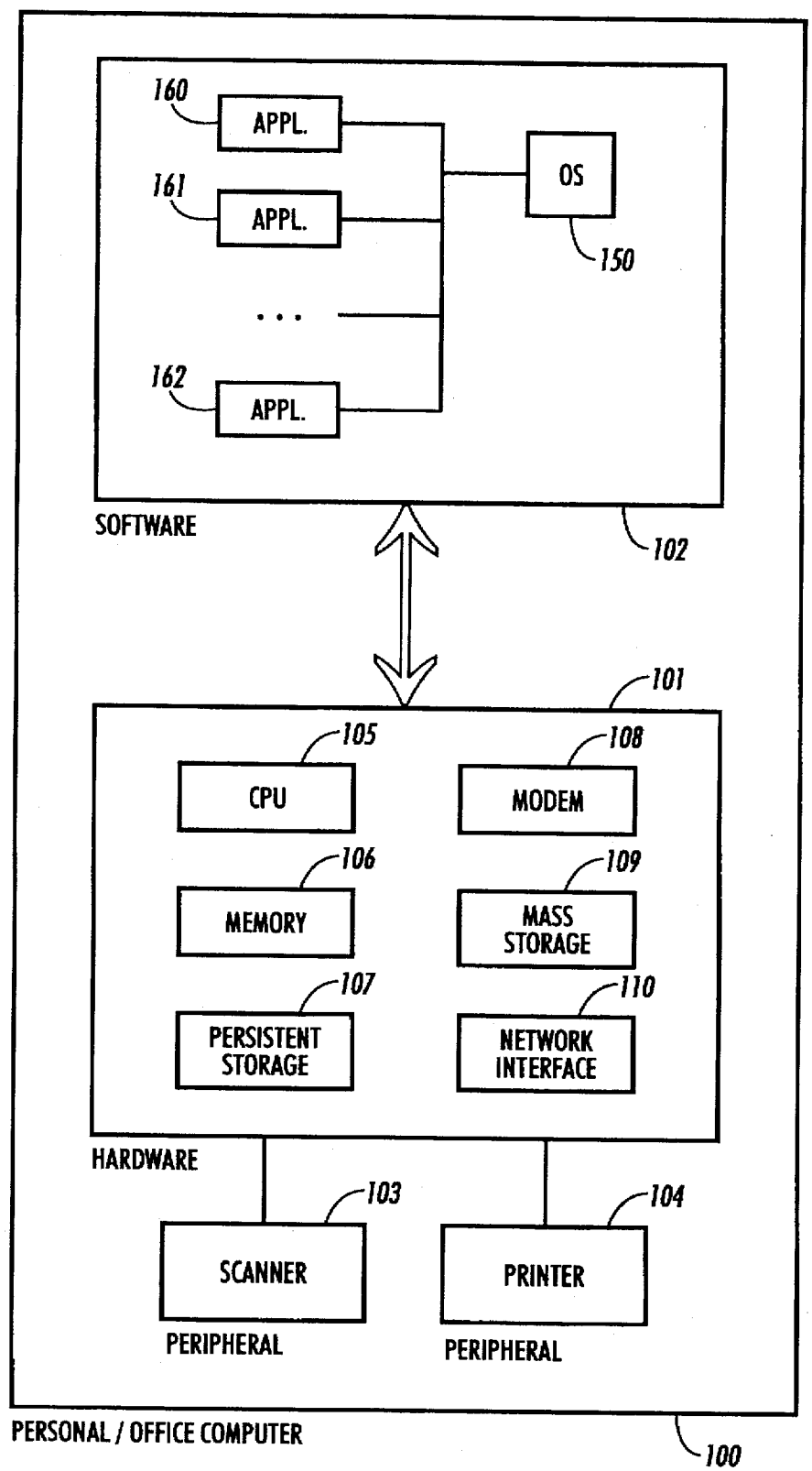
FIG. 3 schematically depicts the components of a computer from the system of FIG. 2.

FIG. 3 schematically depicts the components of computer 100 of the system of FIG. 2. Computer 100 is a personal or office computer that can be, for example, a workstation, personal computer, or other single-user or multi-user computer system. For purposes of exposition, computer 100 can be conveniently divided into hardware components 101 and software components 102; however, persons of skill in the art will appreciate that this division is conceptual and somewhat arbitrary, and that the line between hardware and software is not a hard and fast one. Further, computer 100 is shown as including peripheral components, viz, scanner 103 and printer 104; again, it will be appreciated that the line between host computer and attached peripheral is not a hard and fast one, and that in particular, components that are considered peripherals of some computers are considered integral parts of other computers.

Hardware components 101 include a processor (CPU) 105, memory 106, persistent storage 107, modem 108, optional mass storage 109, and network interface 110. These components are well known and, accordingly, will be explained only briefly.

Processor 105 can be, for example, a microprocessor or a collection of microprocessors configured for multiprocessing. It will be appreciated that the role of computer 100 can be taken in some embodiments by multiple computers acting together (distributed computation); in such embodiments, the functionality of computer 100 in system 10 is taken on by the combination of these computers, and the processing capabilities of processor 105 are provided by the combined processors of the multiple computers.

Memory 106 can include read-only memory (ROM), random-access memory (RAM), virtual memory, or other memory technologies, singly or in combination. Persistent storage 107 can include, for example, a magnetic hard disk, a floppy disk, or other persistent read-write data storage technologies, singly or in combination.

Optional mass storage 109 provides additional (e.g., archival) storage and can be a CD-ROM (compact disc read-only memory) or other large-capacity storage technology. In some embodiments, mass storage is provided by one of the local servers 40 rather than as part of computer 100, for example, a file server or database server. In some embodiments, mass storage as such is omitted, as where persistent storage 107 is of sufficient capacity to meet the needs of computer 100 that would otherwise be served by mass storage.

Network interface 110 provides computer 100 and, more specifically, processor 105 with the ability to communicate via local-area network 41 and (either directly, or indirectly via one of local servers 40) with the Internet 51.

Notably absent from hardware components 101 are a keyboard, mouse or other pointing device, and display screen. Such components, while typically part of most computers, are not necessary to the invention. This is because such components are adapted for providing (for example) a graphical user interface, whereas here the focus is on a paper-based user interface.

Software components 102 include a multitasking operating system 150 and a set of tasks under control of operating system 150, such as applications programs 160, 161, and 162. Operating system 150 also allows processor 105 to control various devices such as persistent storage 107, modem 108, mass storage 109, and network interface 110, as well as peripherals 103, 104. Processor 105 executes the software of operating system 150 and its tasks in conjunction with memory 106 and other components of computer system 100.

Software components 102 provide computer 100 with Formless Forms PUI capability. This capability can be divided up among operating system 150 and applications programs 160, 161, 162 as may be appropriate for the particular configuration of system 10 and the particular application of computer 100 in system 10. For example, operating system 150 can incorporate fax server and Internet server software, and the Formless Forms and Paper Web methods described below can be incorporated in an applications program or programs. It will be appreciated that there are any number of possibilities in this regard.

Formless Forms Method and Examples

Figure 4:
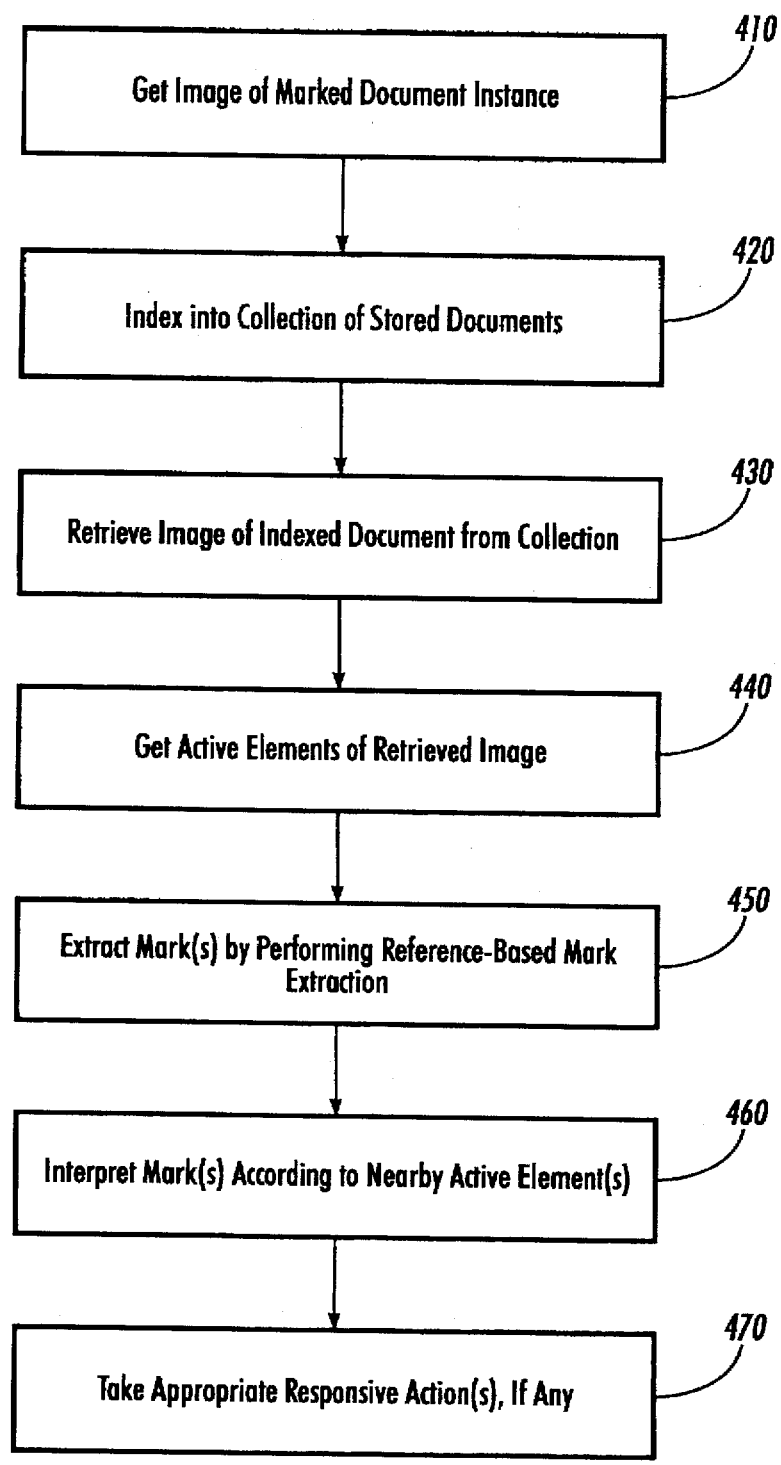
FIG. 4 flowcharts the steps of a method for Formless Forms in one embodiment of the invention.

FIG. 4 is a high-level flowchart for the method of Formless Forms in one embodiment. These steps are carded out using appropriate components of system 10 and, more particularly, computer 100 under control of processor 105.

To begin with (step 410), an image (more precisely, a set of digital data representing an image) of a marked document instance is obtained in computer 100 and is stored in memory 106 for use by processor 105. The image can be a scanned, faxed, or other pixel (raster) image. The image can be scanned in from scanner 103 directly to computer 100, or can be input to system 10 through fax machine 20 or multifunction device 30 and communicated by the appropriate pathways to computer 100. Alternatively, the image can be an image that previously has been scanned and stored in mass storage 109, and retrieved therefrom by computer 100. It is assumed in this embodiment that this image and all document images are black-and-white binary images, although the image can be gray-scale or color in other embodiments. Typically in this embodiment, a document image is an image of a single page or a portion thereof, although a document image can encompass multiple pages in some embodiments.

The image is an image of a marked document instance. That is, it is an image of a particular hardcopy instance of a document (e.g., a printed, faxed, or reprographically produced paper copy, or a hardcopy on a medium other than paper) that the user has in her or his possession and on which instance the user has made a mark (e.g., a graphical or written annotation or addition to the basic document) with a pen, pencil, typewriter, robber stamp, etc.

The image is said to be an image of a "document instance," rather than simply of a document, to highlight the fact that it is an image of a particular (and usually imperfect) copy, printout, or other rendering of a known document for which a (presumably good) original or other reference version has been stored in a database or other collection of documents present somewhere in system 10. The collection of documents can be stored, for example, in mass storage 109, or on a local file or database server 40, or on a Web server 50.

Once the image of the marked document instance has been stored in memory 106 and thus made available to processor 105, the image is used to generate an index into the stored collection of documents (step 420), from which an image of the corresponding stored reference document is retrieved and made available to processor 105 (step 430).

Figure 1:
FIG. 1 (PRIOR ART) is an example of a form used in a known paper-based user interface.

Also, information about the active elements in the retrieved document image is obtained and is made available to processor 105 (step 440). Such elements can be, for example, printed or typeset text or handwritten characters, pictures, graphics, photographs, or any other elements that make up the overall document. According to the invention, an active element need not be a blank element and need not contain any interior whitespace. This is in contrast with the active elements of typical forms of the prior art (such as check boxes 1 and rectangles 2 of the form of FIG. 1), which are typically blank lines, spaces, boxes, or other blank elements. In this embodiment, the active elements for each reference document are determined ahead of time and are stored in and retrieved from the collection of documents along with the reference document images. In some embodiments, the active elements can be separately determined after the reference document image has been retrieved.

Next, processor 105 extracts the user's mark from the marked document instance by performing reference-based mark extraction (step 450). That is, processor 105 compares the obtained image of the marked document instance with the retrieved image of the reference document to determine what the user has changed in her or his version of the document. Preferably, robust techniques are used for this step, as will be discussed below, so that scaling errors, translation errors, transmission and digitization errors, noise, and other image artifacts can be tolerated.

Once the mark is extracted, processor 105 interprets the mark to determine what, if anything, the user wants done in response (step 460). In this embodiment, the interpretation is based on the proximity of the mark with respect to active elements of the document. If the mark is not located near to any active element, the mark is ignored. If the mark is located near to an active element, the mark is interpreted in conjunction with that element. For example, if a straight-line mark or X mark or check mark appears underneath or through or over a word, or an oval mark appears around the word, the mark can be interpreted to mean that the user wants to do something pertaining to the word, such as selecting and following a hypertext link associated with the word or performing optical character recognition on the word and providing the result as input to a search engine, relational database, word processor, or other computational process. In other embodiments, the interpretation can be based on additional factors, such as the shape of the mark and a more sophisticated analysis of the geometric relationship between the mark and the nearby active element. Thus, for example, the interpretation of a line beneath a word can be distinguished from that of a line through a word. In still other embodiments, certain marks, such as a large X mark substantially the size of an entire page, can be interpreted independently of any particular active elements of the document.

Finally, processor 105 performs, initiates, or otherwise causes to be performed any action (or actions) indicated by the interpretation of the user's mark (step 470). The action can be any arbitrary computation.

The action to be taken for each active element can be determined in advance and stored along with the active elements. For example, as previously stated, the processor can follow a hypertext link to retrieve a document related to an element of the document as indicated by the user's mark. The assignment of links to active elements can be done ahead of time. As another example, the processor can take or initiate an action represented by a graphical element in the document; e.g., if the user circles an icon representing a sprinkler, the computer can cause an automatic sprinkler system to be activated. However, the association of active elements with actions to be taken is entirely arbitrary. Thus, continuing the previous example, the action prompted by the user's selection of the sprinkler icon could be something entirely unrelated to sprinklers, such as causing an audio recording to be played or starting a word processing program.

Alternatively, for some or all elements, the action to be taken in response to a user's mark can be computed after the mark has been interpreted. This can be appropriate, for example, where the action to be taken depends on the document content, as in the example given earlier of performing optical character recognition on an underlined word (e.g., a name from a list of employee names) and then providing the recognized word to another program (e.g., a relational database program), which in turn can retrieve new documents (e.g., personnel records) and output them to the user.

If the indicated action calls for output of a document or documents, these can be output from computer 100 to any point in system 10. For example, the document(s) can be output via printer 104, or can be communicated from computer 100 to other devices in system 10 (such as fax machine 20 or multifunction device 30) for output by those devices. As another example, the output document(s) can be electronically mailed from computer 100 to other computers across the Internet 50.

It will be observed in the flowchart of FIG. 4 that image processing techniques are used for the mark extraction step, so that symbolic processing is not needed. Interpretation of the mark's significance takes place after extraction is complete. Although in some embodiments, the content of the document and the shape of the mark can be recognized (as for purposes of finding active elements in the document and/or assigning appropriate actions thereto), according to the invention they need not be recognized at all. For example, the computer can simply look for an element that the user has indicated is active, and (whatever that element is, and whatever the mark is) if the element is sufficiently near to the mark, the element is treated as having been marked and the computer takes or initiates the appropriate action.

Figure 5:
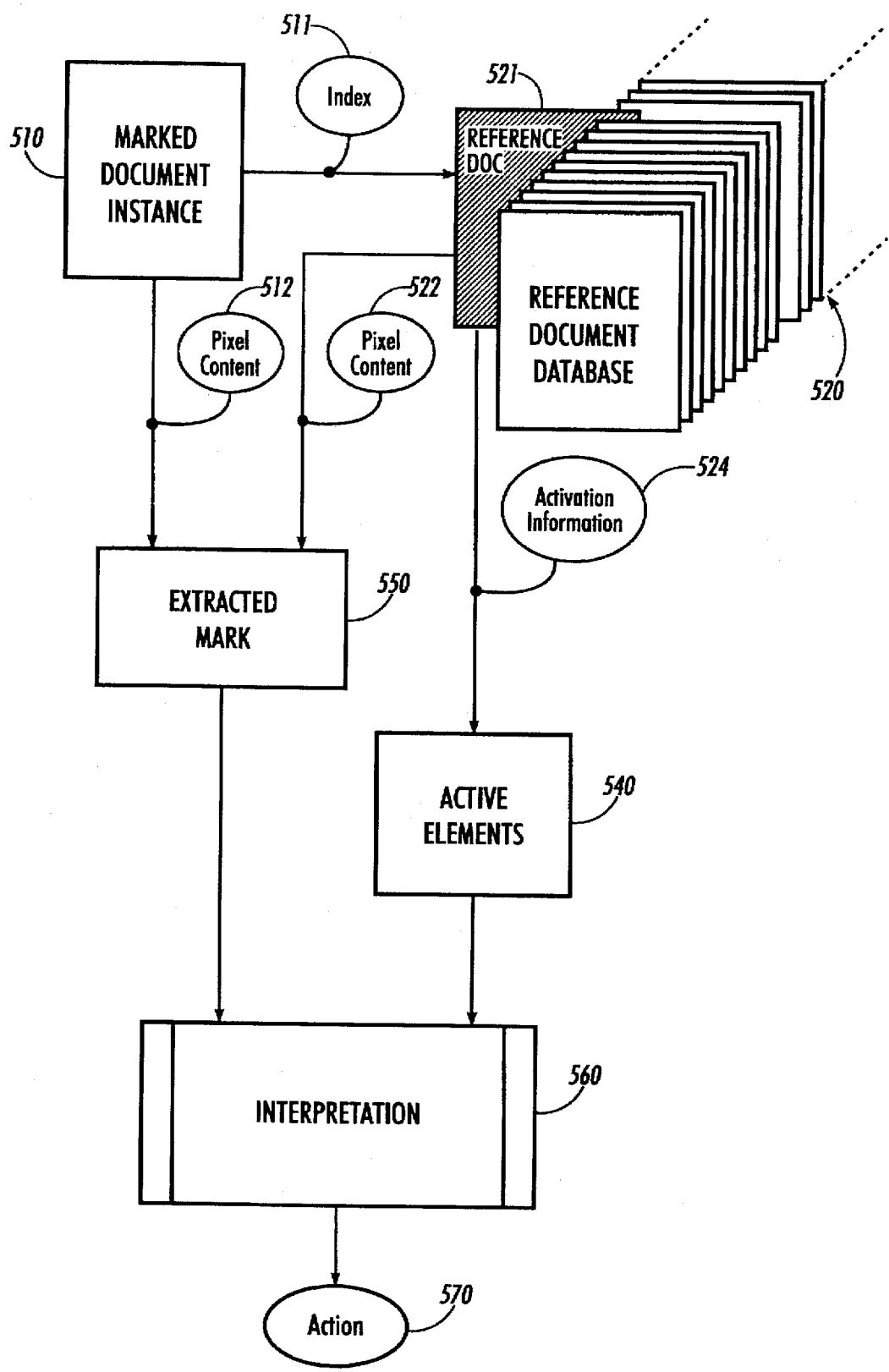
FIG. 5 schematically depicts the information flows in the method of FIG. 4.

FIG. 5 schematically illustrates the flow of information in the method of FIG. 4. A marked document instance 510, obtained in step 410, is used in step 420 to provide an index 511 into a database 520 or other collection of stored documents and so to retrieve a corresponding known reference document 521. The pixel image 512 of marked document instance 510 is compared in step 450 with a pixel image 522 of reference document 521 to produce an extracted mark 550. Also, activation information 524 is retrieved for reference document 521 (this information having been determined advance) and this supplies the active elements 540 of the document in step 440. Given extracted mark 550 and active elements 540, the user's mark can be interpreted in step 460 to produce interpretation 560. This interpretation yields action 570 that is carried out in step 470.

Figure 6:
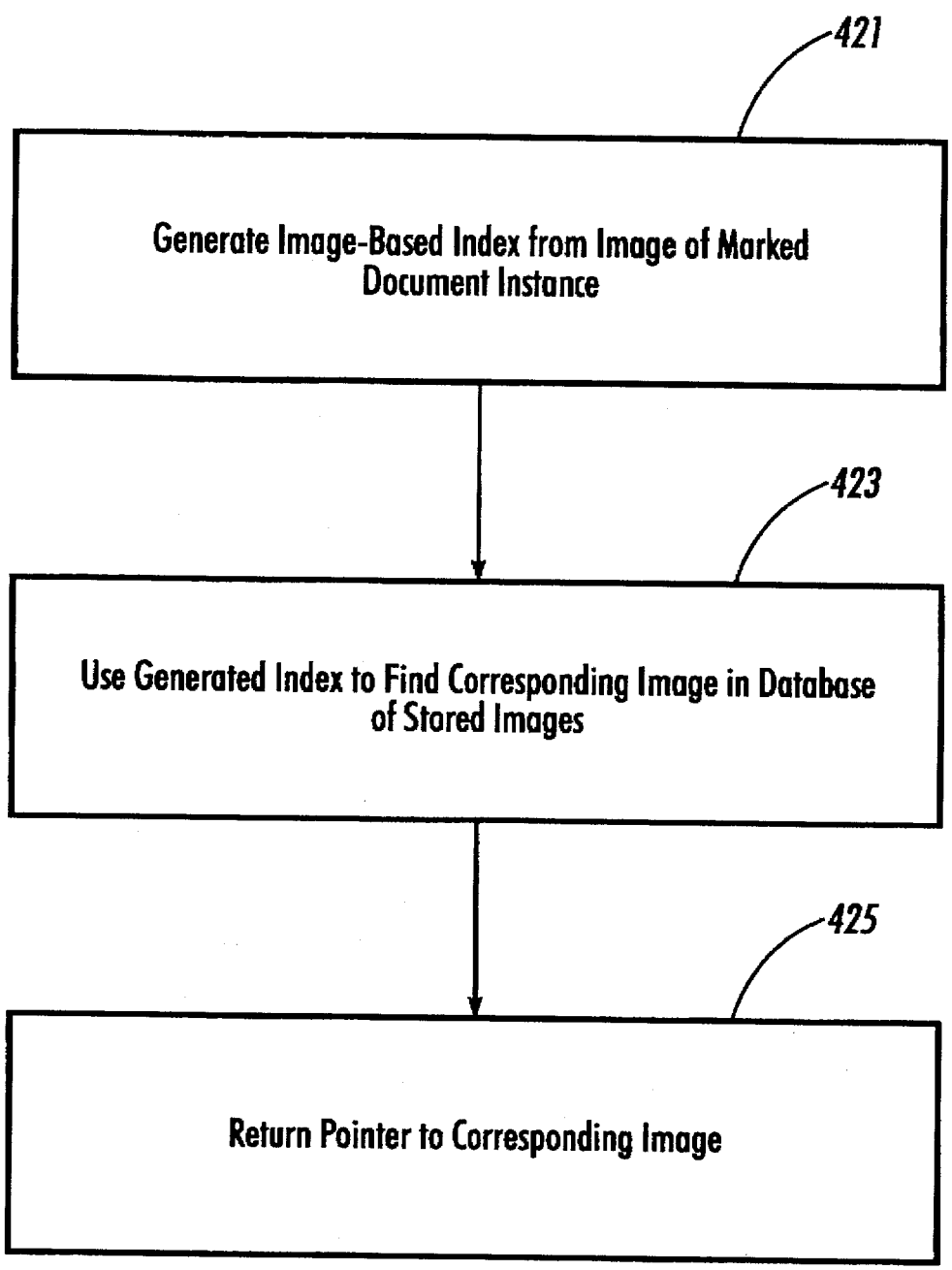
FIG. 6 is a flowchart showing in more detail the indexing step of FIG. 4.

FIG. 6 is a subsidiary flowchart showing in greater detail the indexing step 420 of FIG. 4. Processor 105 generates an index (step 421) and uses this index to find in the database or other collection of documents a stored image that corresponds to the index (step 423). A pointer to the image or other designator as to where the image data is to be found is then returned (step 425), so that the image can be retrieved (in step 430 of FIG. 4).

Preferably, and in this embodiment, an image-based indexing technique is used to generate the index in step 421. An image-based index can be, for example, a number or set of numbers derivable from an image by performing certain image processing operations on that image. The number or numbers are defined such that visually similar documents will tend to have similar indices. Accordingly, an index generated from the image of the user's marked document instance will be close to an index generated from an image of the reference document from which the marked document instance derives.

In this embodiment, an index for each reference document image in the collection is precomputed and is stored in association with the image. Thus, in step 421, the image processing operations needed to derive the index are performed on the image of the marked document instance. The documents of database 520 are stored together with their indices, which are precomputed, and a stored document having an index most closely matching the generated index is found in step 423.

It is possible that two or more stored documents will have similar indices. In this case, a small set of documents, rather than a single document, is found in step 423. Thereafter, as part of step 425 or step 430, each image in the set can be retrieved and compared with the marked document instance image (e.g., by robust matching or by simple correlation) to determine the most appropriate reference document image from among the documents of the small set.

Various image-based indexing techniques can be used for Formless Forms. For example, wavelet decomposition techniques can be used. One such suitable indexing technique is disclosed in "Fast Multiresolution Image Querying" by Charles E. Jacobs et al. (University of Washington Technical Report UW-CSE-95-01-06), wherein it is stated (in section 1, italics in original): "[W]e define an image querying metric that makes use of truncated, quantized versions of the wavelet decompositions [of the images], which we call signatures. The signatures contain only the most significant information about each image." These signatures can be used as indices in the method of the present invention.

Alternatively, a brute-force image-based technique (not strictly speaking an indexing technique, but nonetheless workable) can be used to find the reference document. In this technique, each document in the collection is compared with the marked document instance, using a robust image comparison technique such as Hausdorff matching. Exhaustive search by this approach will eventually lead to the reference document, although this is less efficient than indexing.

In still another approach, a symbolic indexing technique can be used to generate the index in step 421. This approach depends on there being symbolic content in the document. For example, if the document contains printed text, optical character recognition can be performed on the textual portions of the document and the resulting characters used to generate a set of hash codes. The set of hash codes, in turn, is used as the index of the document. As another example, if the document happens to be already coded with a machine-readable symbolic code, such as a data glyph or bar code, this machine-readable code can be used as the index of the document.

Persons of skill in the art will appreciate that a number of different techniques can be used to retrieve the appropriate reference document from a collection of such documents given a marked document instance. Image-based techniques have great generality, and do not require the indexed documents to include any particular kind of content. Symbolic techniques can be used where and as appropriate.

Figure 7:
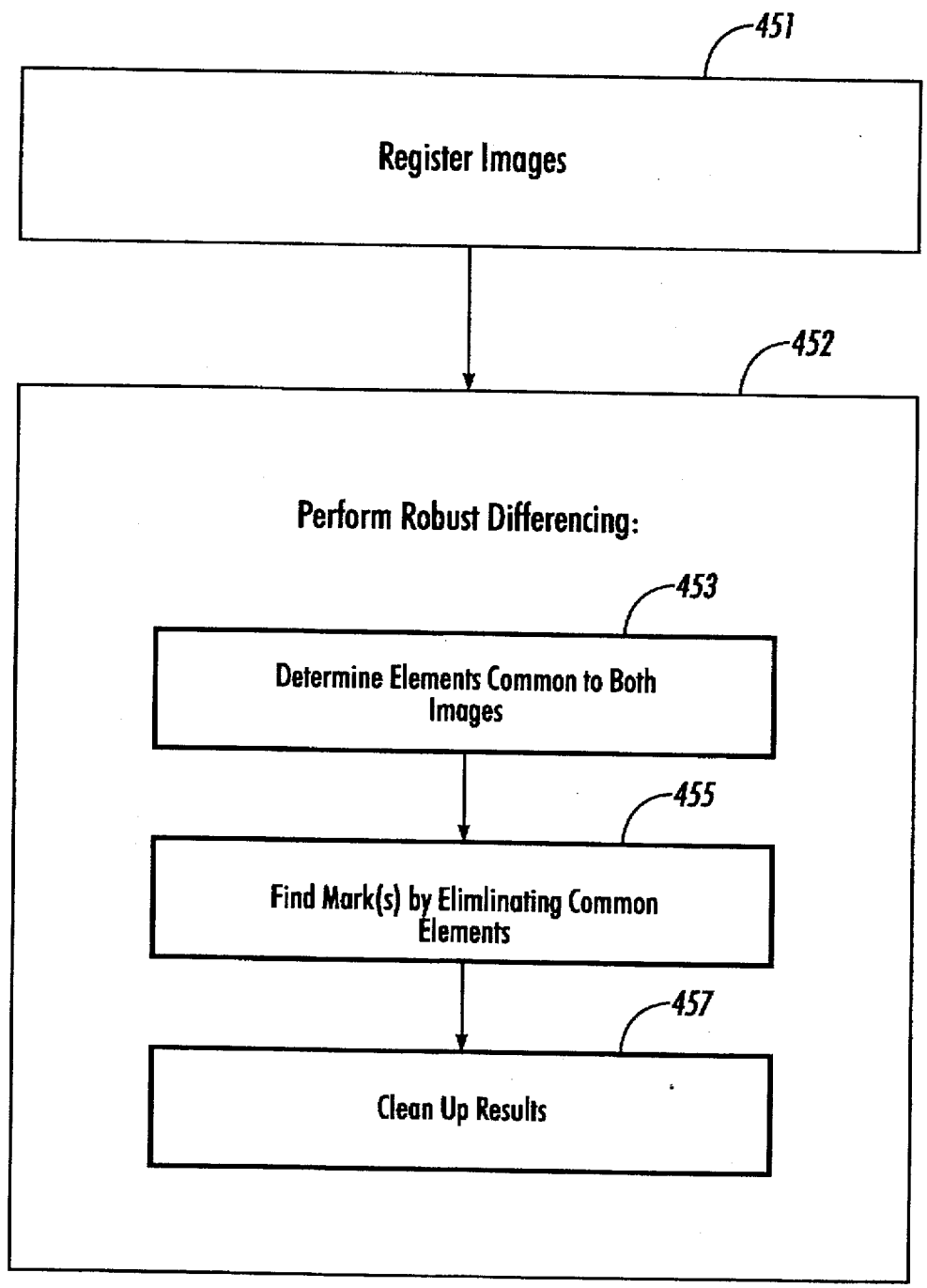
FIG. 7 is a flowchart showing in more detail the mark extraction step of FIG. 4.

FIG. 7 is a subsidiary flowchart showing in greater detail the reference-based mark extraction step 450 of FIG. 4. Extraction proceeds in two basic steps: registration and differencing. In registration (step 451), processor 105 determines how pixels in the marked document instance image map onto pixels in the reference image. In differencing (step 452), the pixels that represent the user's mark are isolated within the image. Essentially, processor 105 looks for every element in the image of the marked document instance that matches a corresponding element in the reference document image, and eliminates all these matches; whatever is left over is presumed to be something that the user added, that is, a mark.

Registration is performed because the marked document instance image can be translated, rotated, scaled, skewed, distorted, and otherwise misaligned with respect to the reference document image. If differencing is performed on unregistered images, it is likely to produce spurious results. Preferably, registration is performed using Hausdorff matching techniques, although straightforward binary correlation techniques could also be used in principle. (Notably, registration does not rely on the use of registration marks or other special symbols, and thus can be accomplished in the image domain, without symbolic processing.)

In differencing, processor 105 determines the elements that are common to both images (step 453), finds the user's mark or marks by eliminating the common elements (step 455), and then optionally performs thresholding or other "clean up" operations to eliminate noise, unintentional stray marks, and the like, thus leaving the meaningful mark or marks (step 457). Preferably, differencing is performed on the registered images using robust image differencing techniques, although straightforward binary correlation techniques could also be used in principle.

In this embodiment, a robust image differencing technique is used. In step 453, the common elements are found by applying a matching technique to the registered images: Any group of black pixels (assuming here that the images are black-on/white-off binary images) that is found in both of the registered images and whose respective positions in the two registered images are sufficiently "close" to one another are deemed to be common elements (that is, elements of the marked document instance image which are adequately accounted for by elements of the reference document image and which, therefore, presumably were not introduced by the user's mark.) In step 455, the complement of the matching result obtained in step 453 is taken, thus eliminating the common elements and leaving only those elements that were unmatched. Put another way, in step 455 the processor 105 finds groups of black pixels in the marked document instance image that have no counterparts in the reference document image. Thereafter, in step 457, a thresholding of connected components according to component size can be performed to eliminate isolated noise pixels and the like. This leaves only larger, substantially contiguous groups of black pixels to be considered as marks.

The robust differencing performed in steps 453 and 455 can be expressed more formally as follows: Let M={m}= $\{m_1, m_2, m_3 \ldots \}$ be the set of black pixels in the registered reference image, and let I={i}=$\{i_1, i_2, i_3 \ldots \}$ be the set of black pixels in the registered marked instance image. Pixels m in M have x and y coordinates $(x_m, y_m)$ and pixels i in I have x and y coordinates $(x_i, y_i)$; for example, pixel $m_1$ has coordinates $(x_{m_1}, y_{m_1})$ and pixel $i_1$ has coordinates $(x_{i_1}, y_{i_1})$. Compute $$\Delta(i) = \min_{(m \in M)} \|m - i\|$$

for all i in I; that is, $\Delta(i)$=the minimum distance between pixel i and any pixel in M. Then the set of mark pixels Y is $$Y=\{i | \Delta(i) > \delta\}$$

where δ is a selected threshold value. The set Y optionally can be further processed (as in step 457) to eliminate mark pixels that are likely to be due to noise or otherwise insignificant.

To accomodate nonlinear distortions, piecewise computation of the registration and differencing steps can be used. This approach will be helpful if pieces are sized such that that locally within any piece, the distortion is not too drastic. The piecewise computation is illustrated schematically in FIGS. 8A–8B. In each of FIGS. 8A and 8B, an image 80 is divided into local regions (regions 81 in FIG. 8A and regions 81' in FIG. 8B), and each region is separately registered and difference& The regions can be nonoverlapping, as shown in FIG. 8A, or can overlap, as shown in FIG. 8B.

When using the piecewise approach, the pieces are independent of one another, so that the loop order implied by FIG. 7 can be reversed: That is, it is possible either to compute registrations for all pieces, then compute differencings for all pieces; or to compute registration and differencing for the first piece, registration and differencing for the second piece, etc. It will be appreciated that other approaches, such as processing the various pieces in parallel (as where the "processor" is in fact a multiprocessor architecture or a collection of computers operating in parallel), are also possible.

Figure 8A:
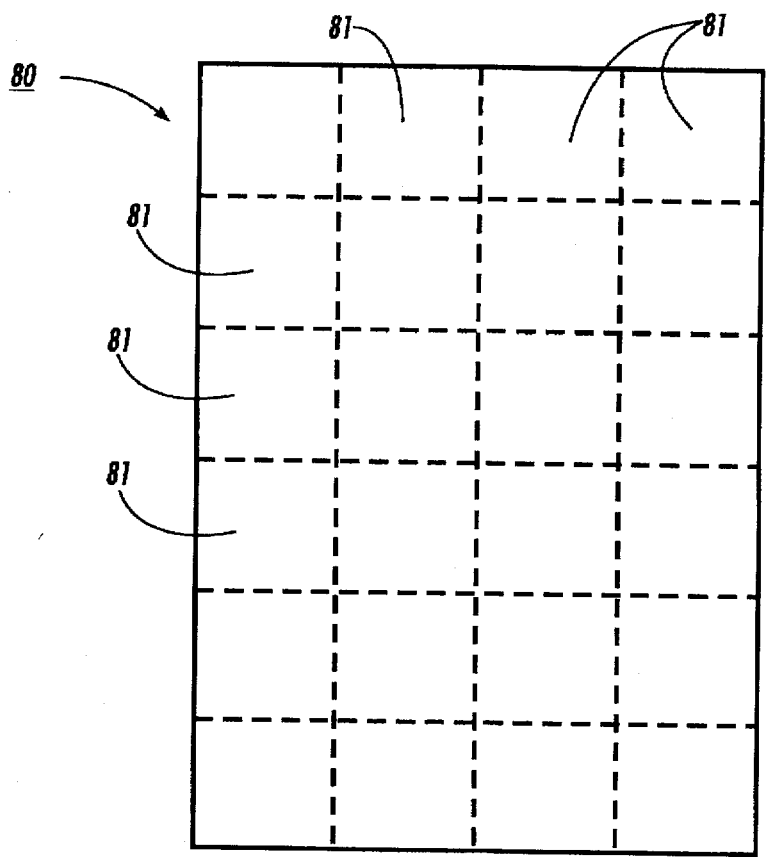
FIGS. 8A–8B schematically depict how an image can be divided into regions for purposes of registration and differencing.
Figure 8B:
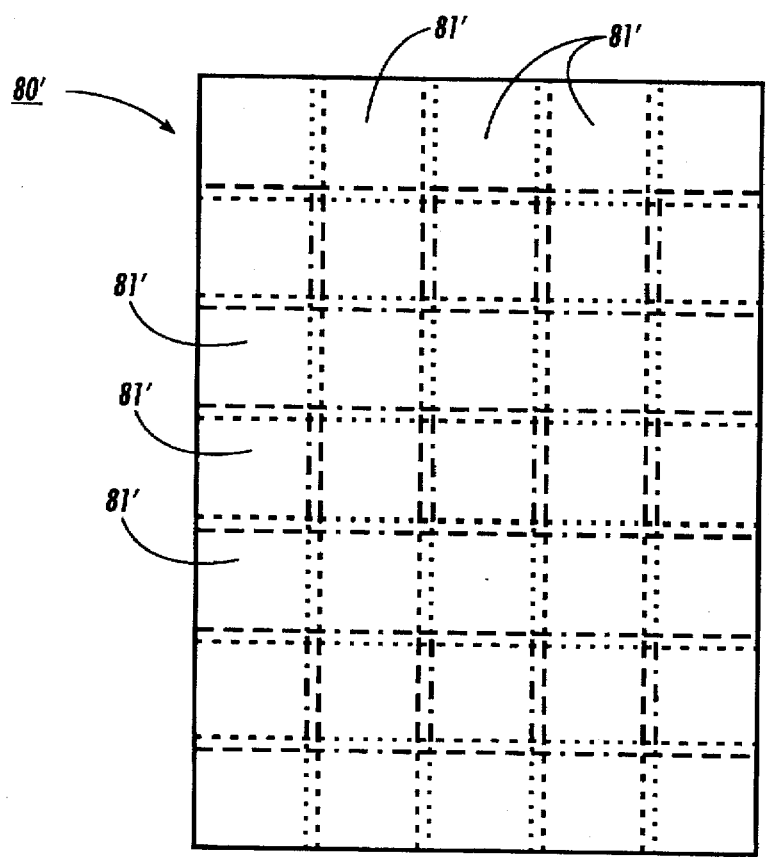

Note that in the differencing step 452, the entire marked document instance image is compared with the entire reference image, whether or not differencing is accomplished piecewise as shown in FIGS. 8A–8B. This contrasts with known computerized form interpretation methods in which only predesignated active regions of a form are analyzed and other areas are ignored for efficiency. For example, in a conventional method, if a form includes a paragraph of explanatory text and a set of check boxes, the check boxes are the only elements of concern to the computer. So the computer focuses its analysis of the marked-up form in those areas of the page where the check boxes appear and ignores the rest of the page, since any analysis of portions of the form beyond those necessary to determine whether the check boxes have been marked would be wasteful of computing resources. By contrast, according to the invention, comparison of the entire marked-up form with the entire reference document is advantageous, not wasteful. It is, in part, why arbitrary documents can be used as Formless Forms: A mark can be made and recognized anywhere in a document, because the computer looks for marks everywhere in the document.

Figure 9:
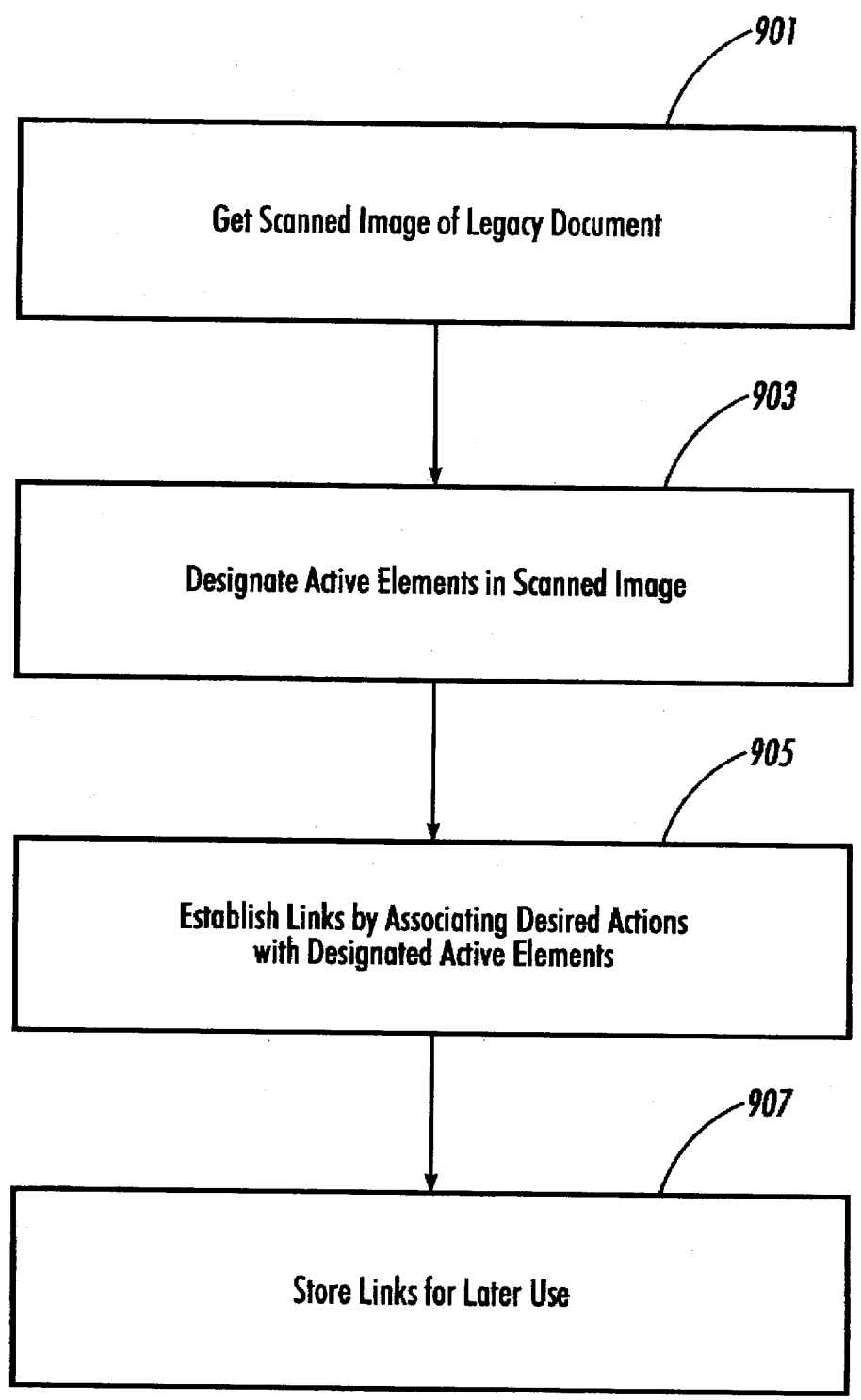
FIG. 9 flowcharts a method for assigning active elements to a Formless Form.

FIG. 9 is a flowchart showing how the active elements of a document image (such as the retrieved document image obtained by processor 105 in step 440) can be designated. In this embodiment, the active elements of reference document images are designated in advance and stored with the document images in database 520, so that the active elements can be retrieved contemporaneously with the reference document image. In other embodiments, the active elements can be stored separately from the reference document images, or can be designated or otherwise determined at run time.

To designate the active elements, the reference document image is scanned, retrieved from storage, or otherwise made available to processor 105 (step 901). Thereafter, active elements are designated (step 903) and are linked (that is, associated) with their respective actions (step 905). The designation and linking can be done by a user with appropriate editor software, wherein the user manually designates which elements of the image are to be active and what actions are to be associated with each. Alternatively, designation and linking can be done semiautomatically, as where the processor carries out symbolic recognition of the image content (e.g., OCR plus word recognition), designates each recognized symbol as an active element, and assigns an action according to the type of symbol and the recognized content. The active elements and their associated actions are stored for later use (step 907) as a lookup table, association list, or other suitable data structure.

In FIG. 9, the reference document is referred to as a "legacy" document, that is, a document that predates the Formless Forms system (here, system 10) in which it is used. Typically, a legacy document is a document that was not originally intended for use as a form. For example, it can be an original or photocopied paper document that has been scanned into system 10. According to the invention, a legacy document can nevertheless be used as a reference document of the collection. Thus a legacy document that was not designed for use as a form can nevertheless be used as a Formless Form. Moreover, a legacy document can be converted into a Formless Form without symbolic recognition of the legacy document image, and the designation and assignment of active elements in the document and actions to be taken upon a user's selection of such elements can be essentially arbitrary.

The series of views of FIGS. 10–12 show exemplary test results produced by reference-based mark extraction software suitable to carry out the steps of the flowchart of FIG. 7, using piecewise registration and differencing as was illustrated in FIG. 8. The software is written in Lisp and in C++ and was run on a Silicon Graphics Indy workstation. FIG. 10 shows a portion of the reference document image. FIG. 11 shows the marked document instance, which in this example is a marked-up fax copy of the reference image. FIG. 12 shows the extracted marks.

Figure 13:
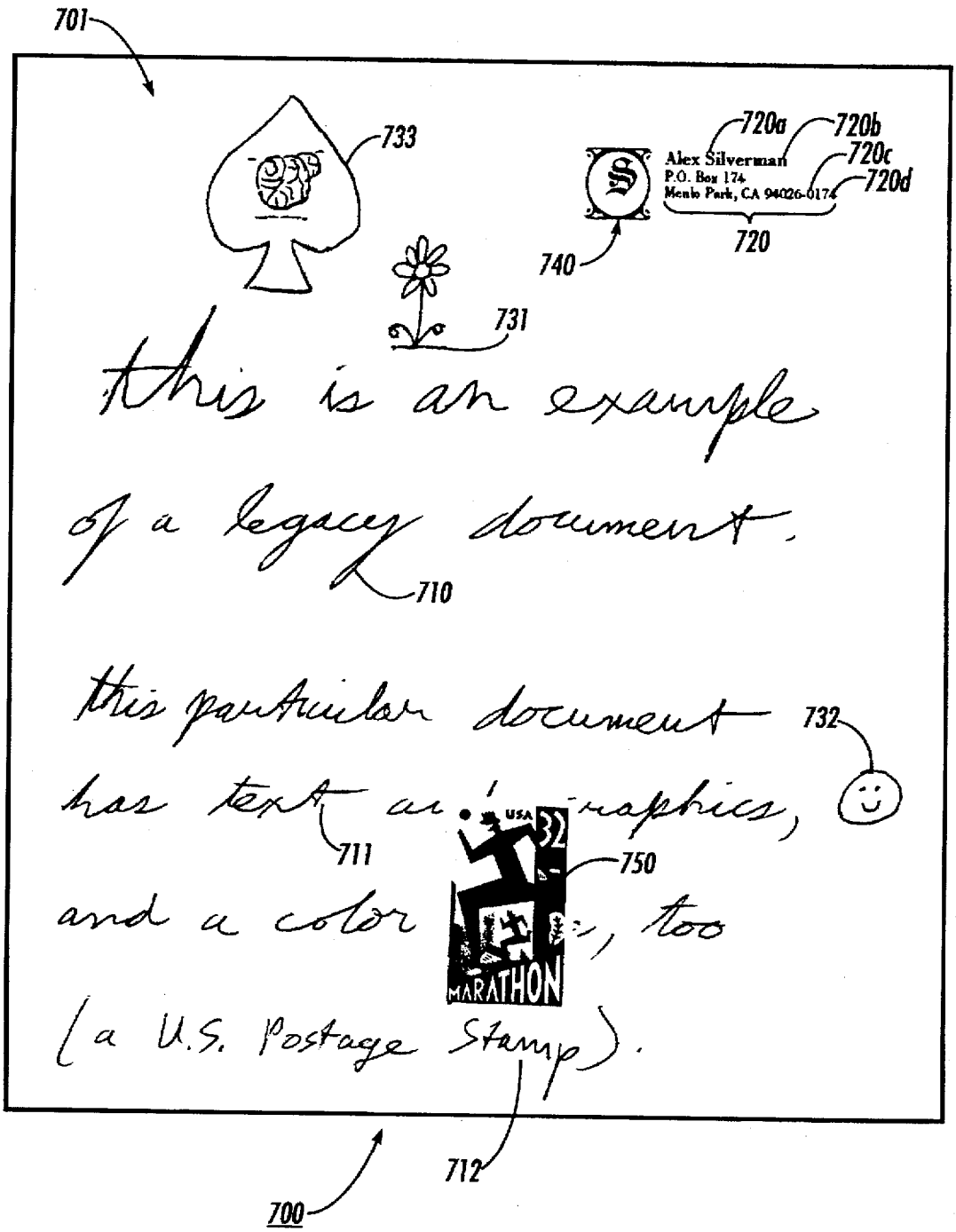
FIGS. 13–19 are a series of views showing an illustrative example of processing a Formless Form according to the steps of the method of FIG. 4.

The series of views of FIGS. 13–19 show an illustrative example of processing a Formless Form according to the steps of the method of FIG. 4. FIG. 13 shows the original document 700, which will be used as the reference document in this example. Document 700 includes various elements surrounded by a whitespace background 701. The elements of document 700 include handwritten words such as words 710, 711, and 712, typeset text 720, hand-drawn graphical elements including flower 731, face 732, and spade 733, typeset graphic element 740, and a detailed graphic 750 from a U.S. Postal Service first-class stamp. (Note that a given group of contiguous or related black pixels can be considered a single element for some purposes and a collection of elements for other; thus, for example, typeset text element 720 can also be considered to be a collection of many separate elements such as letter characters 720a, 720b and number characters 720c, 720d.)

Figure 14:

FIG. 14 shows an instance 800 of document 700. The user has instance 800 on hand and wants to use as input to a Formless Forms PUI that has document 700 among its collection of reference documents. Instance 800 is a photocopy of document 700 and is reduced in scale from the original. It is unmarked.

Figure 15:
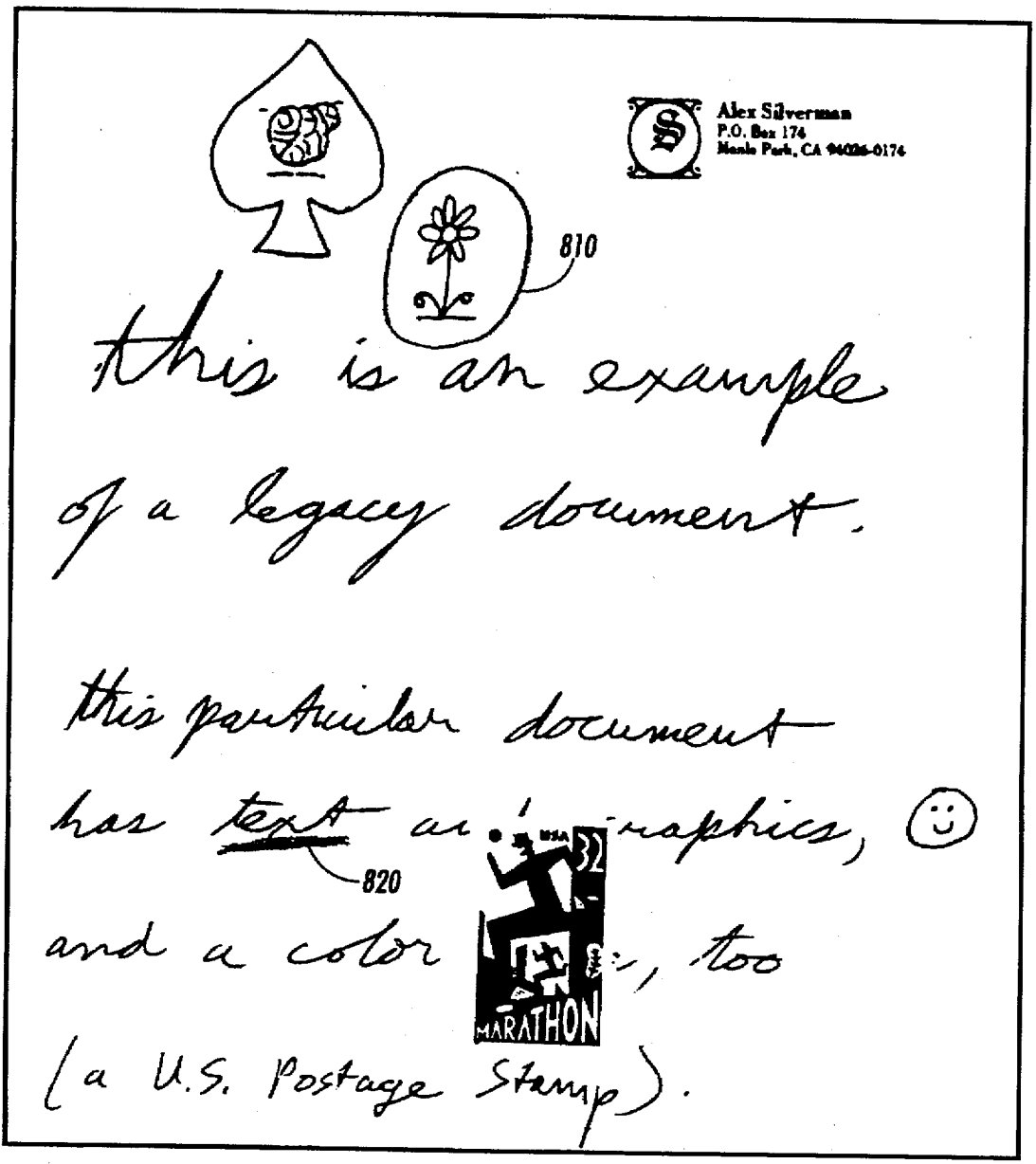

FIG. 15 shows an instance 800' of document 700. It is the same as document instance 800 of FIG. 14, except that it has been marked by the user with marks 810 and 820.

Figure 16:
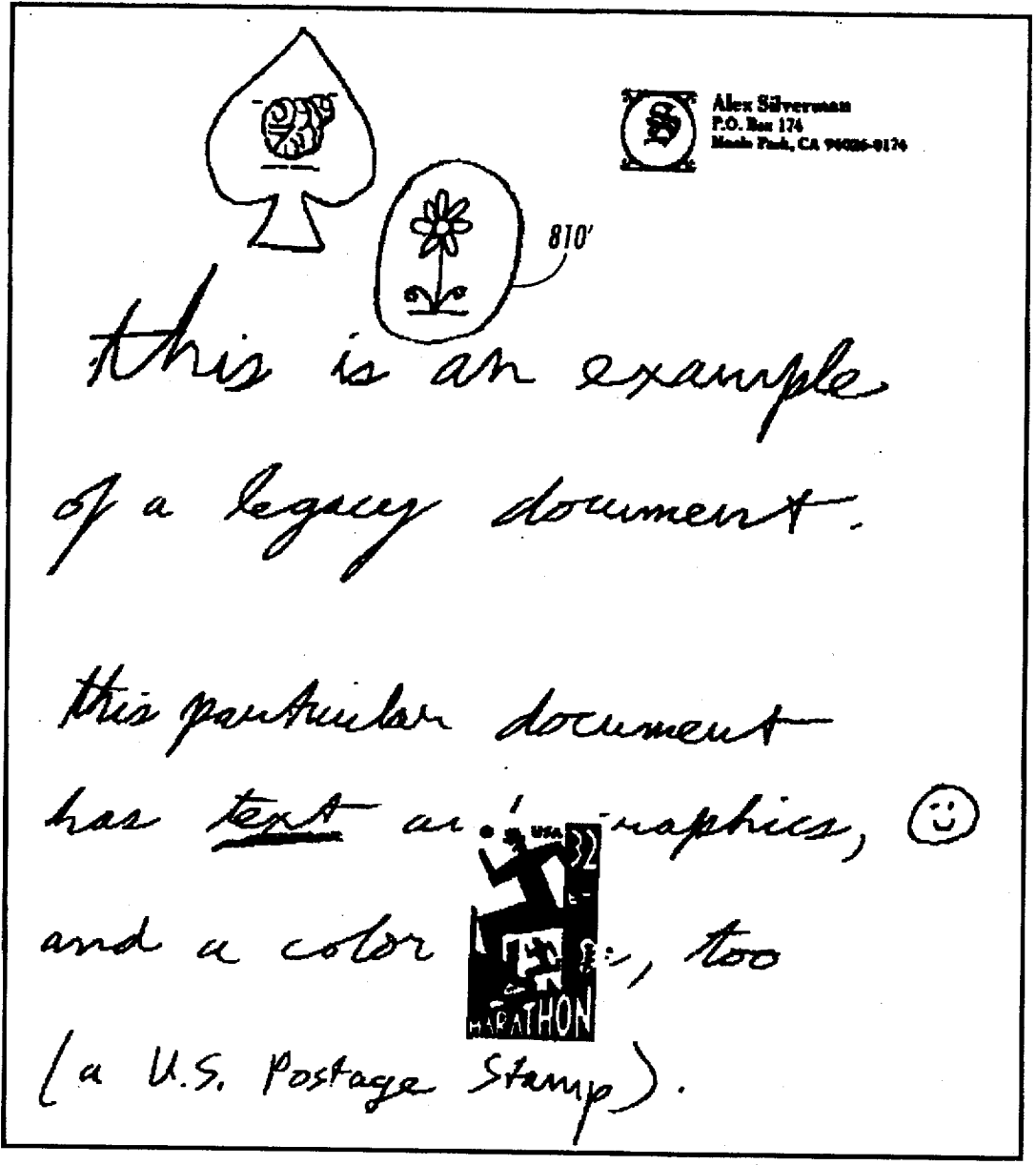

FIG. 16 shows an instance 800" of document 700. It is the marked document instance as received via fax (e.g., received by computer 100 from fax 20) and provided to processor 105 (step 410). Note the stairstepping artifacts ("jaggies") caused by the relatively low resolution of the fax. These are visible, for example, in the bottom portion of mark 810' (the faxed version of user mark 810).

Figure 17:
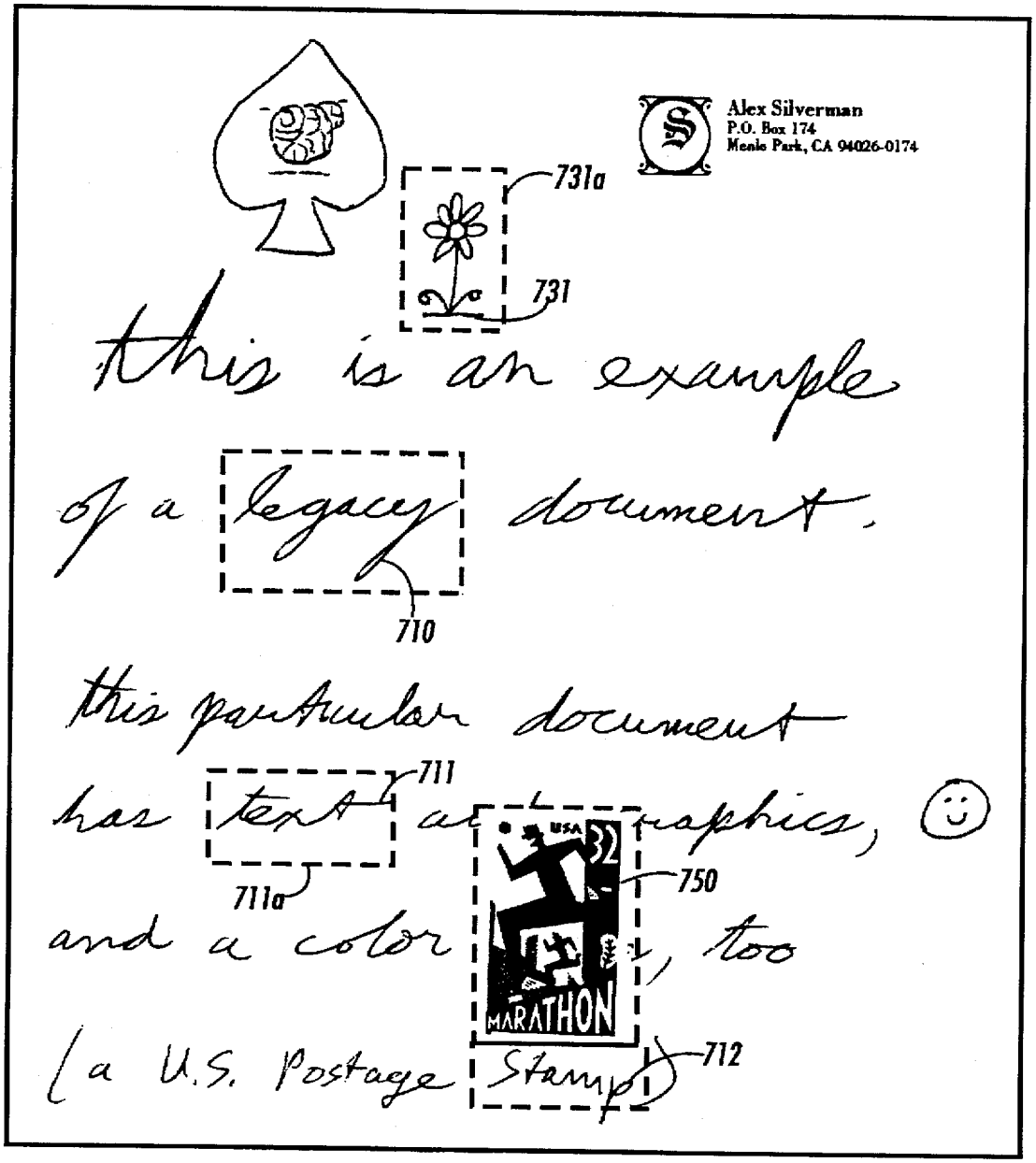

Processor 105 generates an image-based index from the image of instance 800" into the stored collection of documents (step 420), from which an image of the corresponding stored reference document, that is, document 700, is retrieved (step 430). Also, information about the active elements in the retrieved document image is obtained by processor 105 (step 440). FIG. 17 shows an exemplary designation of active elements for document 700. Dashed rectangles, such as rectangles 711a and 731a, have been drawn around elements 710, 711, 712, 731, and 750 to indicate schematically that these elements have been designated as active.

The dashed rectangles in FIG. 17 delimit the extent of the elements they surround. This can be done in two ways: (1) An entire rectangle can be defined as an active region. A user mark near, in, or substantially overlapping this region is deemed to pertain to the rectangle, and thus to the active element surrounded by the rectangle. Note that with this approach, a rectangular region can be drawn anywhere in the image, and need not surround an element; for example, a rectangle could be drawn so as to encompass only the right-hand half of stamp 750 or only the upper half of flower 731. (2) The rectangle indicates a group of black pixels that are to be treated as a single element, regardless of whether these pixels are contiguous. The actual boundaries of the element, however, are not necessarily rectangular, but are determined by the shape of the element itself, e.g., by dilation of the boundary of the element. This approach is helpful in cases where it is not immediately clear whether a group of black pixels is to be treated as a single element or as multiple elements (as was discussed previously with respect to element 720 in FIG. 13, for example).

Thus the dashed rectangles 711a and 731 can be seen either as themselves being the boundaries of their respective active elements 711 and 731 (approach (1)), or as simply being indicative of the general vicinity in which the actual boundaries, as determined by the element shape, are located (approach (2)). The latter approach (approach (2)) is preferably used in this embodiment. Whatever way they are defined, the location of active element boundaries can be important in determining which mark pertains to which active element in the mark interpretation step (step 460).

In general, in order to establish the boundaries of particular active elements, an active link editor program (step 903 of FIG. 9) can be run on the image of document 700. Methods are known for characterizing active elements in legacy documents, either manually or semiautomatically (e.g., methods for converting legacy documents into Web or other hypertext documents). These methods and similar methods can be applied in such an editor program. For example, an editor program can be made to run interactively on a computer having a graphical user interface. The editor program presents an image of document 700 and allows the person running the program to designate elements to be activated by selecting these elements with an editing tool that establishes rectangular or other desired boundaries around particular pixel groupings. In particular, rectangular boundaries corresponding to the dashed rectangles of FIG. 17 can be selected for the elements of document 700.

Figure 18:
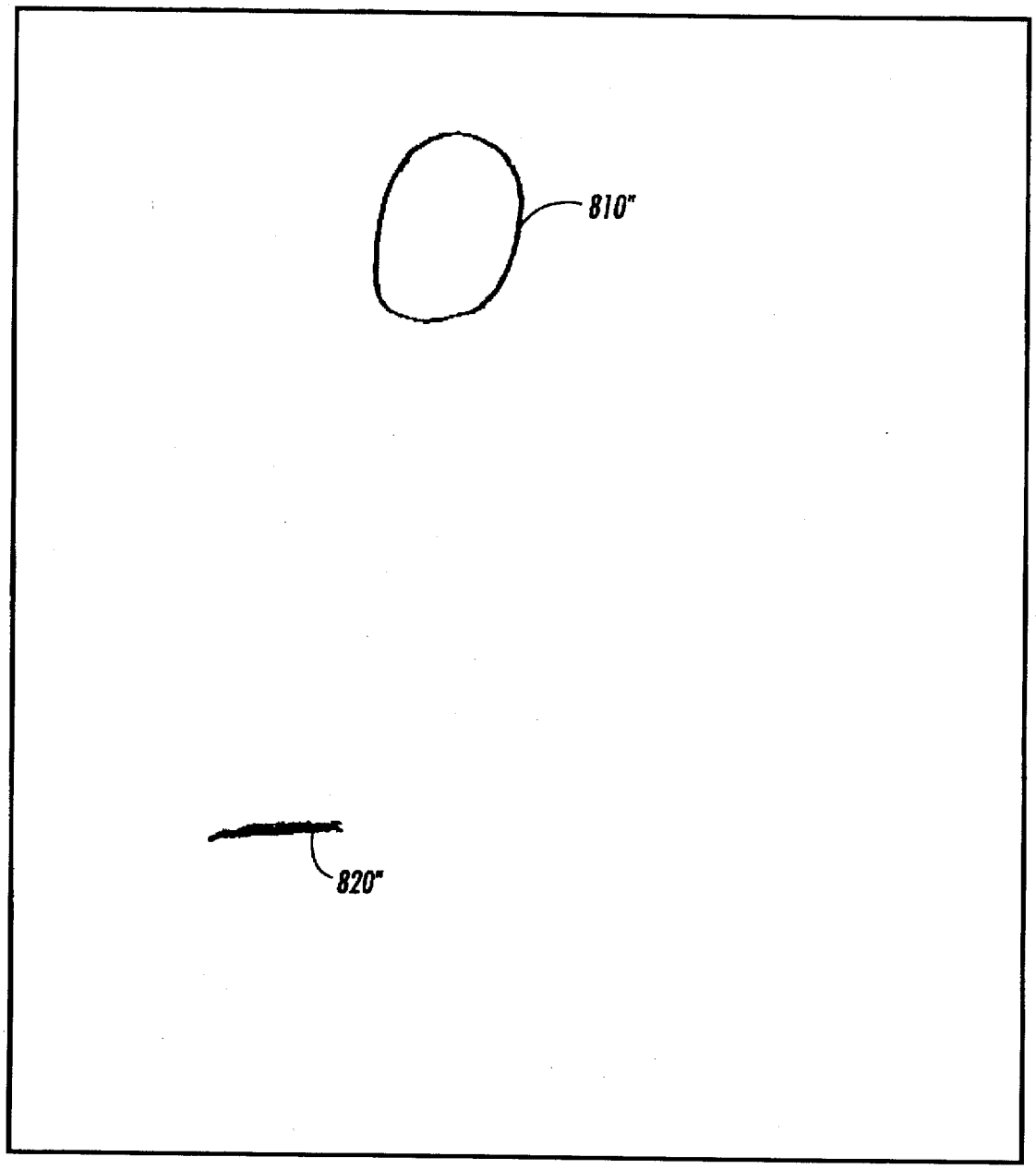

FIG. 18 shows a difference image 880 containing extracted marks 810", 820". It is the result of performing mark extraction (step 450) on image 800" using the image of document 700 as the reference image. (The image of FIG. 18 is, with respect to the example of FIGS. 13–19, what the image of FIG. 12 is with respect to the example of FIGS. 10–12.)

Figure 19:
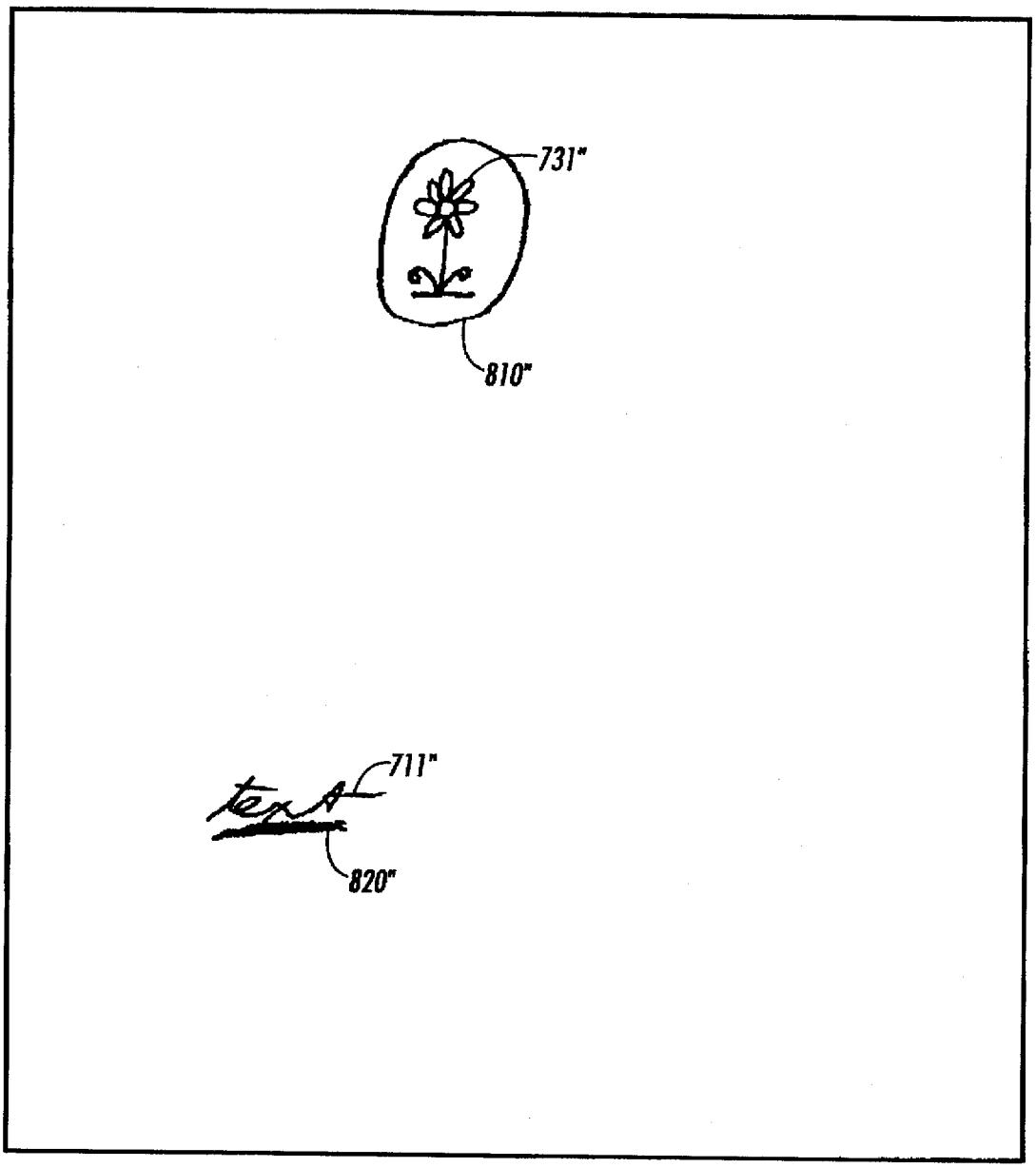

FIG. 19 shows an image 890 that includes the extracted marks 810", 820" from difference image 880 plus the elements 731", 711" to which these marks respectively pertain. Although image 890 need not explicitly be formed during the interpretation step (step 460), it is illustrative of an interpretation result, and is intended here to schematically depict such a result. The interpretation is that the user has selected two of the five active elements of document 700, namely, word 711 and flower 731. Processor 105 can then take any actions associated with these selected elements. (step 470).

Paper Web

The World Wide Web has become the most active part of the Internet. The Web has a large and rapidly growing number of sites, each site typically offering a collection of hypertext documents, or pages. (For purposes of this description, it is convenient to speak of each Web page as being a single hypertext document, and to treat a collection of interlinked Web pages as being a database of hypertext documents, rather than as being a single larger hypertext document.) Each page in the Web has a unique identifier called a universal resource locator, or URL. The Web as a whole can be thought of as a heterarchically organized database of hypertext documents.

Web pages are active documents. They can be linked to each other through hypertext links (also known as "hot links," active links, hyperlinks, etc.). A link provides a reference from one Web page to another. Each link associates a displayed or displayable element of a Web page in which the link appears with a URL that identifies another Web page. When the user selects the displayed element, the computer retrieves the associated URL and then uses the retrieved URL to retrieve the Web page that the URL identifies. Thus the user can move through the Web from one page to another to another by following the links on successive pages.

Web pages supporting textual, graphical, photographic, audio, and video materials are written in hypertext markup language (HTML). Web pages can also be written to support executable applications software, such as software written in the Java programming language (available from Sun Microsystems, Inc., Mountain View, Calif.).

The Web is well suited for interactive, on-line use. Typically, a Web user browses (or "surfs") the Web by running browser (client) software on a computer equipped with a graphical user interface. The brower software can be an applications program, such as Netscape Navigator (available from Netscape Communications, Inc., Mountain View, Calif.), or can be built into the operating system. The browser lets the user display Web pages on a visual display device, such as a CRT or flat-panel display screen. The browser also lets the user select and follow links in the Web page with a pointing device, such as a mouse or a trackpad. Selecting a displayed link causes the computer to traverse the link, that is, to fetch the Web page pointed to by the URL associated with the link.

Known Web browsers can render an HTML document as a pixel image and can instruct the computer about what portions of rendered image are "hot links," that is, are to be treated as active elements that can be addressed by the user with a mouse or other pointing device so as to prompt the computer to retrieve other Web pages. Known Web browsers can also print out the rendered images of Web pages. Unfortunately, when the page is printed, the hypertext link information is ordinarily lost.

The question, then, is how to restore the lost link information to the printed Web page. This can be done by treating a printed Web page as a Formless Form. The result is Paper Web.

Paper Web is conceived as a new kind of Web browser. It, too, can render an HTML document and determine the positions of active elements in the rendered image. Paper Web creates and saves a map of the active elements, their positions in the rendered image, and their associated hypertext links. PaperWeb can then treat a printout of the rendered Web page as a Formless Form, by using its stored map to restore the hypertext links that would otherwise be lost.

Here is an example of how Paper Web can work: Suppose the user is situated at a fax machine located remotely to a host computer that is in connection with the Web. The computer runs software to support a Paper Web browser having an integrated fax server. The computer retrieves a Web page and faxes a hardcopy of the retrieved page to the user. The user marks the hardcopy to indicate a particular hypertext link that the user wishes to follow. For example, the user circles, underlines, or draws an X over a graphical object, text string, or other active element representing the link. The user then faxes the hardcopy thus marked back to the computer. The computer determines what Web page the user has sent and what Web link the user has indicated. The computer then follows the indicated link to obtain a new Web page, which it faxes back to the user.

FIG. 20 shows an example of a printed Web page 1000 which has been marked by the user and faxed back to computer 100 for processing by Paper Web. The user has marked a graphical button 1001 with an X mark 1002, indicating that the hypertext link represented by button 1001 is to be followed.

Figure 21:
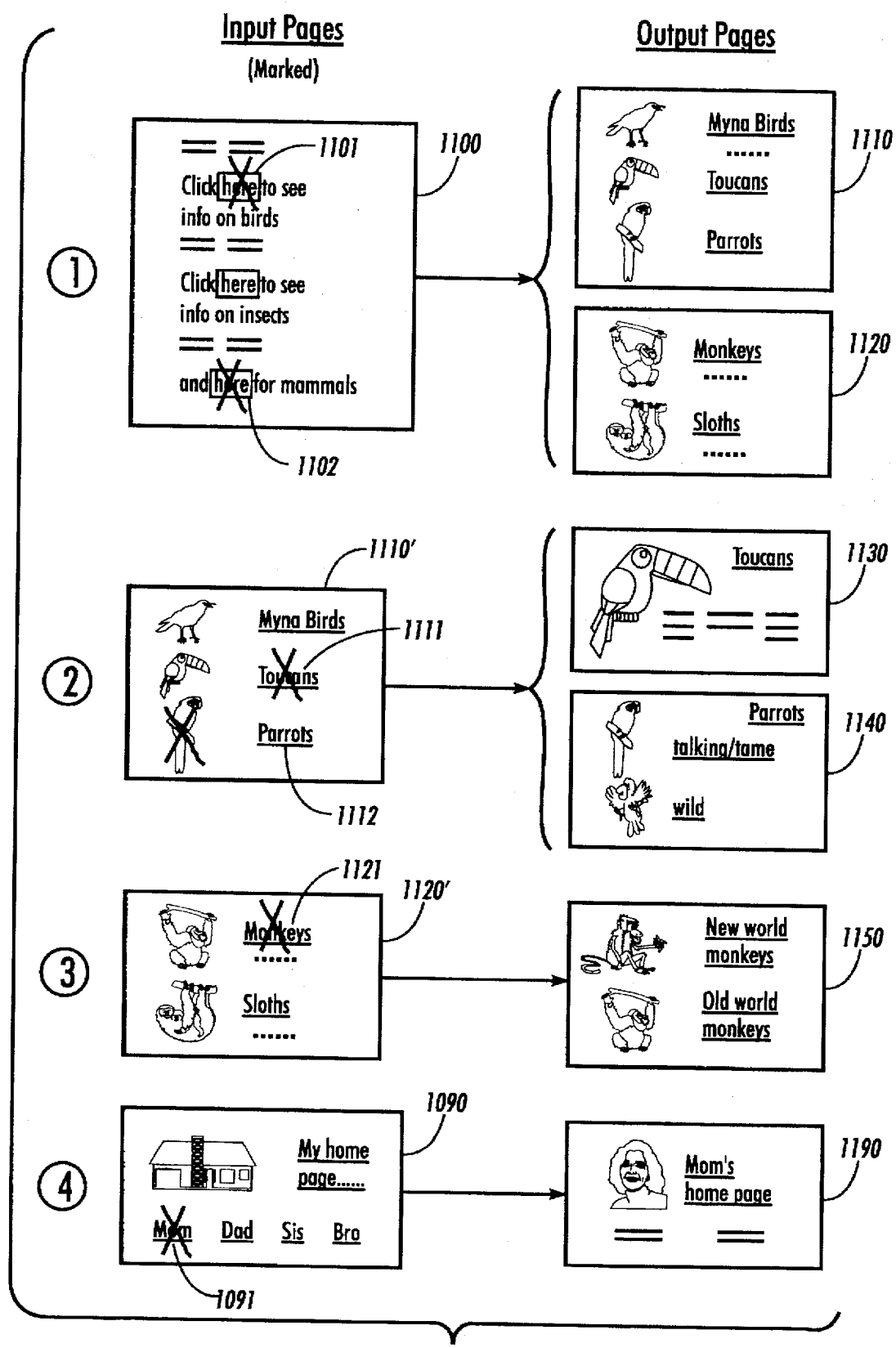
FIG. 21 is a series of views that depicts the inputs and outputs of an exemplary interchange between a user and a computer running a PaperWeb browser.

The series of views in FIG. 21 illustrates an example of a sequence of interactions between a user and Paper Web. In view (1), the user inputs an instance of (e.g., scans or faxes into the computer a paper copy or printout of) a page 1100 on which the user has indicated two links by writing X marks on active elements 1101, 1102 of page 1100. Paper Web interprets these marks and follows the links to retrieve two new pages 1110, 1120, which are printed out for the user. Paper Web also adds the new pages 1110, 1120 to its collection of known documents. (Note that with Paper Web, the user can follow multiple links at the same time, something not ordinarily possible with typical known GUI-based Web browsers.)

In view (2), the user inputs a marked instance 1110' of the page 1110 that was previously retrieved in view (1). The user has indicated by X marks on active elements 1111, 1112 two links to be followed from page 1110. Paper Web recognizes page 1110 and calls up its stored image from the collection of reference documents. Then, using the stored image of page 1110 to extract and interpret the user's marks, Paper Web follows the indicated links to retrieve two additional new pages 1130, 1140, which are printed out for the user and which are also added to the collection.

In view (3), the user inputs a marked instance 1120' of the page 1120 that was previously retrieved in view (1). The user has indicated by an X mark on active element 1121 a link to be followed from page 1120. Paper Web recognizes page 1120 and calls up its stored image from the collection of reference documents. Then, using the stored image of page 1120 to extract and interpret the user's marks, Paper Web follows the indicated link to retrieve another additional new page 1150, which is printed out for the user and which is also added to the collection.

Finally, in view (4), the user inputs an instance of the user's own home page 1090. Paper Web is assumed to keep this page (or, more generally, at least one default page representing a convenient starting point for the user) in its collection at all times. The user has indicated by an X mark on active element 1091 a link to be followed from page 1110. Paper Web recognizes page 1090 and calls up its stored image from the collection of reference documents. Then, using the stored image of page 1090 to extract and interpret the user's marks, Paper Web follows the indicated link to retrieve yet another additional new page 1190, which is printed out for the user and which is also added to the collection.

Figure 22:
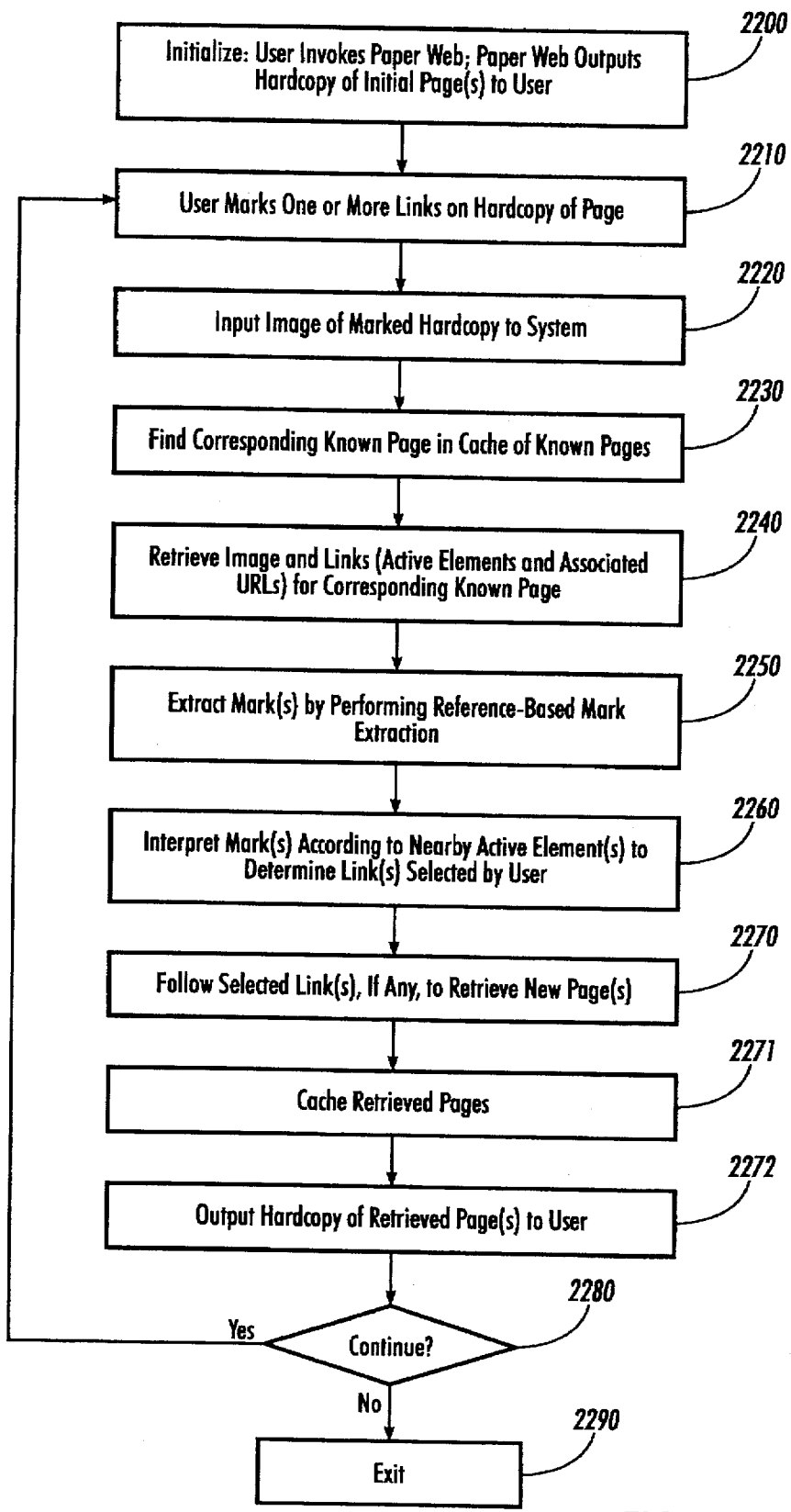
FIG. 22 flowcharts a method for Paper Web in one embodiment.

FIG. 22 is a high-level flowchart for the method of Paper Web in one embodiment. These steps are carried out using appropriate components of system 10 and, more particularly, computer 100 under control of processor 105.

Initially, the user invokes Paper Web, for example, by calling computer 100 on the telephone or by scanning in a special start-up document. This causes Paper Web to output a hardcopy of the user's default page or pages (e.g., the user's home page or the user's "bookmark list" containing links to the user's favorite Web sites) to the user (step 2200).

Thereafter, Paper Web enters a work loop in which the user marks up instances of hardcopy Web page printouts in his or her possession (step 2210) and sends these instances to the computer, which follows the indicated links and sends back new printouts. The computer continually updates a cache of the Web pages previously visited by the user, so that these pages can be recognized if marked instances of the pages are presented as input.

More particularly, the loop begins with the user marking one or more links on a paper or other hardcopy instance of a Web page known to Paper Web (step 2210). A scanned, faxed, or other pixel image of this marked page instance is provided to system 10, sent to computer 100, and stored in memory 106 for use by processor 105 (step 2220).

Once the image of the marked page instance has been made available to processor 105, the image is used to find the corresponding known Web page in the cache (step 2230). This can be done, for example, by generating an image-based or other index from the marked page instance image. The cache stores associations between the indices of previously visited Web pages (i.e., pages known to the system and therefore usable as reference documents) and the contents of these pages. The cache can store the actual contents of each cached page (that is, the HTML representation of the page), or simply store the page's URL.

After the correct page has been found, processor 105 retrieves the image and hypertext link information for the page (step 2240). If the cache contains the HTML representation of the page, the processor can render the HTML directly to produce a bitmap and to determine where the active regions are in this bitmap. If the cache contains only the URL, the processor first can fetch the page from a Web server storing the reference documents.

Next, processor 105 extracts the user's mark from the marked document instance by performing reference-based mark extraction (step 2250), using as the reference document image the rendered image of the cached page. That is, processor 105 compares the image of the user's marked page instance with the rendered image of the cached page to determine what links the user has marked. Preferably, Hausdorff registration and robust differencing techniques are used to accomplish this step, as described earlier in connection with Formless Forms.

Once the mark is extracted, processor 105 interprets the mark or marks to determine what links, if any, the user has selected (step 2260). This can be done, for example, by determining the proximity of the user's mark or marks to the pixels that represent the hypertext links of the page. In other words, Paper Web interprets the user's mark or marks by treating each mark as the paper-based equivalent of a mouse click. Just as a GUI-based Web browser can determine the location of a user's mouse cursor with respect to a rendered image of a Web page and thereby can determine what link, if any, the user has selected, here Paper Web can determine the location of the user's mark or marks with respect to the rendered image of the Web page and thereby can determine what link or links (if any) the user has selected. Thus, if the pixels of the user's mark intersect (or are nearby to, or otherwise indicate) pixels of the rendered Web page that correspond to Web page elements representing one or more hypertext links, these links are deemed to have been selected by the user.

Processor 105 follows any link or links that the user has the selected and retrieves the Web pages indicated by these links (step 2270). Processor 105 computes index values for these pages and saves the index values, together with the page's HTML contents or URL as the case may be, in the cache (step 2271). In this way, the newly retrieved pages will be recognizable if, at a future time, the user wishes presents them to Paper Web in hopes of revisiting them. Also, processor 105 provides hardcopy output of the retrieved pages to the user (step 2272). At this point the loop can either continue (step 2280) or terminate, in which case Paper Web is exited (step 2290).

Paper Web maintains a continually growing cache of known pages in this embodiment. In other embodiments, the cache can be limited in size and be purged from time to time of little-used pages. At a minimum, at least one page, such as the user's home page or other default page, should remain in the cache at all times, so that Paper Web always has at least one page that it can recognize and that the user can use as a starting point for Web exploration.

Figure 23:
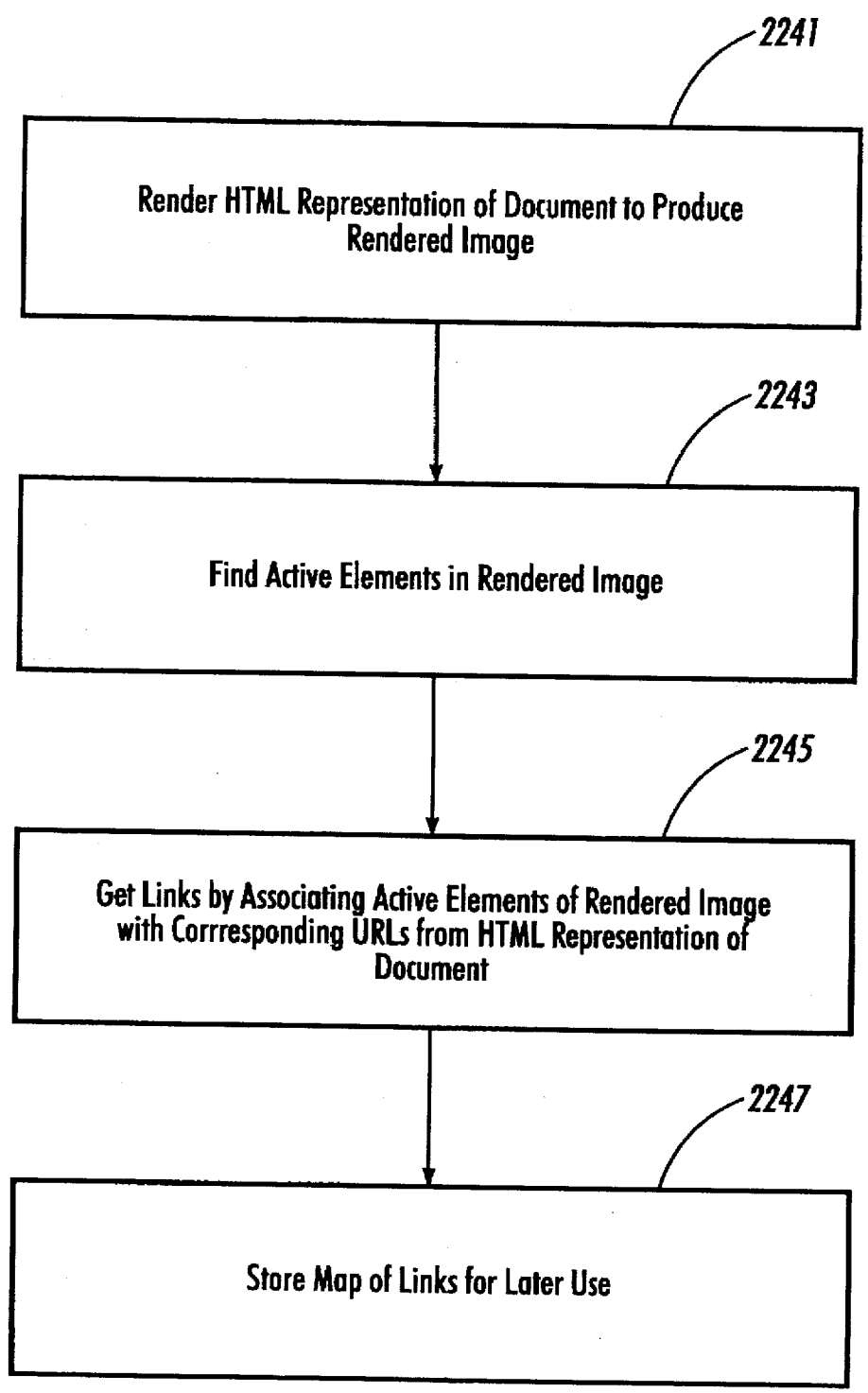
FIG. 23 flowcharts a method for assigning active links in Paper Web.

FIG. 23 is a subsidiary flowchart showing in more detail how, in step 2240 of FIG. 22, Paper Web determines the locations of hypertext links in retrieved pages. Paper Web begins by rendering the HTML representation of the page to produce a rendered pixel image (step 2241). Next, Paper Web determines which pixels of the rendered image correspond to the active elements specified in the HTML (step 2243). This can be done, for example, using methods similar to those known for solving the analogous problem in GUI-based Web browsers. That is, Paper Web can determine the locations of those pixels corresponding to hypertext links for a rendered image of a given Web page in much the same way that a GUI-based Web browser of the prior art can determine the corresponding pixel locations for a displayed image of that Web page. Once the pixels representing active elements in the rendered image have been located, the links can be obtained by associating these active elements with their corresponding URLs, as specified in the HTML representation of the page (step 2245).

Finally, the map of active links is stored (step 2247) for later use during the mark interpretation step (that is, in step 2260 of FIG. 22). However, the map need not be stored with the cached page. Whereas in the embodiment of Formless Forms described earlier, the map of active links for each reference document was preferably precomputed (as shown in FIG. 9) and stored with the reference document, here, the map of active links can conveniently be computed at run time. That is because unlike legacy documents, which must be specially converted for use as active or hypertext documents, HTML documents are intended from the outset to be hypertext documents. So, once Paper Web has found the appropriate cached page corresponding to a given input page instance, Paper Web can readily regenerate the map of pixels to links from the HTML representation of the page. Paper Web, in effect, restores the hypertext functionality that otherwise is lost upon printing out the Web page.

Conclusion

Formless Forms provides a way to "bring paper documents to life" by turning ordinary, inactive/nonhypertext documents into active-forms and hypertext documents. The Formless Forms approach can be used, for example, to turn legacy documents that were never intended for use as forms into forms, or (as in Paper Web) to make paper printouts of World Wide Web or other hypertext pages as powerful and useful as their on-screen counterparts. With Formless Forms and Paper Web, computer users can access the World Wide Web or any hypertext database without a mouse, keyboard, or display screen. All the user needs is a fax machine, a pen, and a telephone number to call their computer.

Four key features of Formless Forms are:
1) indexing
   (e.g., image-based indexing of a marked document instance to retrieve a corresponding reference document from a database);
2) reference-based mark extraction
   (e.g., registration of marked and unmarked document images via Hausdorff or other matching techniques, followed by robust differencing of the registered images);
3) designation and 4) interpretation of active elements in what would otherwise be inactive documents (e.g., associating textual, graphical, photographic, or any other elements of legacy documents with corresponding actions, thus allowing even non-forms to behave like forms; associating elements of hardcopy versions of Web or other hypertext documents with corresponding hypertext links in the original HTML or other source documents, thus allowing even a paper printouts of a Web page to provide the user with ready access to any and all other linked Web pages).

In Formless Forms, the appearance of the page defines the form, rather than vice versa. Thus the appearance of a computer-recognizeable form for a PUI need no longer be restricted as in the past. A "form" can be made from virtually any document—whether or not that document was ever intended for use as a form—and its design need not be confined by the limited graphical vocabulary of known form editors and design tools. Moreover, the time and effort invested in designing new machine-readable forms can be reduced, because legacy documents (in particular, printed forms designed to be read by human beings but not by machines) can be made machine-readable.

The foregoing specific embodiments represent just some of the possibilities for practicing the present invention. Many other embodiments are possible within the spirit of the invention. For example:

• The method of Paper Web can also be used with other hypertext document databases besides the World Wide Web. Such hypertext document databases include, for example, internal use of the Web within companies (so-called "Intranet") and CD-ROM based hypertext databases such as CD-ROM encyclopedias, collections of patents on CD-ROM, and the like. (In system 10, CD-ROM 109 can be used to this end.)

• There are other kinds of Web page interaction devices in use besides simple active links. For example, many Web pages have type-in boxes (e.g., as for entering a user name or a search string), and some have point-and-click image panels (e.g., as for a graphical map browser, in which the user can point to a map location and the Web server responds by returning a more detailed map of the indicated location). For type-in boxes, the mark interpretation component of Paper Web can be augmented with handwriting recognition software to convert a user's handprinted response (which is initially found, without recognition, by Paper Web's mark extraction component) to an ASCII text string that can be sent by the computer to the Web server. For a point-and-click image panel, the mark interpretation component of Paper Web can be augmented to determine relatively precise geometric information from the marked-up image. For example, if the user draws an X over the position of interest, the mark interpretation processing can find the intersection of the two lines that make up the X, and send the position of that intersection on to the Web server.

Accordingly, the scope of the invention is not limited to the foregoing specification, but instead is given by the appended claims together with their full range of equivalents.

The claimed invention is:

1. A method comprising the steps of:
providing a processor with a first document image comprising digital image data including a first plurality of pixels, the first document image representing an instance of a reference document to which instance a mark has been added, the reference document having a plurality of elements;

providing the processor with a second document image comprising digital image data including a second plurality of pixels, the second document image being selected from among a plurality of document images and representing the reference document without the mark;

with the processor, automatically extracting from the first document image a set of pixels representing the mark by performing a reference-based mark extraction technique wherein the second document image serves as a reference image and wherein substantially the entirety of the first document image is compared with substantially the entirety of the second document image;

providing the processor with information about a set of active elements of the reference document, each active element being one element among the plurality of elements of the reference document, the reference document having at least one such active element, each active element being associated with at least one action;

interpreting with the processor the extracted set of pixels representing the mark by determining whether any of the active elements of the reference document is indicated by the mark; and if an active element is indicated by the mark, facilitating with the processor the action with which such active element is associated.

2. The method of claim 1 wherein, in the extracting step, the reference-based mark extraction technique includes a step of:

computing a robust difference of the first and second images via an image processing operation carded out without recognition by the processor of any symbolic content in either of the first or second document images.

3. The method of claim 2 wherein the step of computing a robust difference comprises:

determining a collection of pixels common to both the first and second images by matching pixels of the first image with pixels of the second image according to a matching criterion; and eliminating as between the first and second images the pixels of the collection thus determined, thereby determining a set of discrepancy pixels including a set of pixels representing the mark.

4. The method of claim 1 wherein, in the extracting step, the reference-based mark extraction technique includes the steps of:

registering the first and second images with one another; and computing a robust difference of the registered first and second images.

5. The method of claim 4 wherein the step of computing a robust difference comprises the steps of:

finding common elements as between the images; and eliminating the found common elements to locate a discrepancy between the first and second document images.

6. The method of claim 4 wherein the steps of registering the first and second images and computing a robust difference of the registered images are performed piecewise on local subregions of the document images.

7. The method of claim 1 wherein the interpreting step comprises determining whether the mark is proximate to any active element.

8. A method comprising the steps of:

providing a processor with a first document image comprising digital image data including a first plurality of pixels, the first document image representing an instance of a reference document to which instance a mark has been added, the reference document having a plurality of elements;

generating an image-based index from the first document image without recognition of any symbolic content of the first document image;

selecting a second document image from among a plurality of document images according to the generated index, the second document image comprising digital image data including a second plurality of pixels, the second document image representing the reference document without the mark;

providing the processor with the second document image;

with the processor, automatically extracting from the first document image a set of pixels representing the mark by performing a reference-based mark extraction technique wherein the second document image serves as a reference image and wherein substantially the entirety of the first document image is compared with substantially the entirety of the second document image by computing a robust difference of the first and second images;

providing the processor with information about a set of active elements of the reference document, each active element being one element among the plurality of elements of the reference document, the reference document having at least one such active element, each active element being associated with at least one action;

interpreting with the processor the extracted set of pixels representing the mark by determining whether any of the active elements of the reference document is indicated by the mark; and if an active element is indicated by the mark, facilitating with the processor the action with which such active element is associated.

9. The method of claim 8 wherein the step of computing a robust difference comprises:

determining a collection of pixels common to both the first and second images by matching pixels of the first image with pixels of the second image according to a matching criterion; and eliminating as between the first and second images the pixels of the collection thus determined, thereby determining a set of discrepancy pixels including a set of pixels representing the mark.

10. A method comprising the steps of:

converting a first document instance into a first document image comprising digital image data including a first plurality of pixels, the first document instance being an instance of a reference document to which instance a mark has been added, the reference document having a plurality of elements, the reference document being a document other than a form;

converting a second document instance into a second document image comprising digital image data including a second plurality of pixels, the second document instance being an instance of the reference document without the mark;

annotating the second document image with a set of annotations comprising at least one annotation, each annotation establishing an association between an element of the reference document and at least one action, each element for which such an association is thus established being termed an "active element";

providing the processor with the first and second document images and the set of annotations;

with the processor, automatically extracting from the first document image a set of pixels representing the mark by performing a reference-based mark extraction technique wherein the second document image serves as a reference image;

interpreting with the processor the extracted set of pixels representing the mark by determining, with reference to the set of annotations, whether any of the active elements of the reference document is indicated by the mark; and if an active element is indicated by the mark, facilitating with the processor the action with which such active element is associated.

11. The method of claim 10 wherein the step of converting the second document instance comprises scanning a hardcopy instance of the second document with a digital scanning device.

12. The method of claim 10 wherein the step of converting the second document instance comprises rendering a symbolic description of the second document into a bitmap form.

13. The method of claim 10 wherein:

the step of converting the second document instance comprises scanning a collection of hardcopy document instances including the second document instance with at least one digital scanning device, thereby producing a collection of scanned document instances, and storing the scanned document instances in a database accessible to the processor; and the providing step comprises retrieving the second document image from the database by generating an image-based index from the first document image without recognition of any symbolic content of the first document image and selecting a second document image from among the scanned document images in the database.

14. The method of claim 13 wherein:

the annotating step is performed prior to the providing step and comprises storing the set of annotations and wherein the providing step comprises contemporaneously retrieving the second document image and the set of annotations.

15. A method comprising the steps of:

providing a processor with a first document image comprising digital image data including a first plurality of pixels, the first document image representing an instance of a reference document to which instance a mark has been added, the reference document including a plurality of elements, the mark indicating a selection of a preferred element of the reference document, the preferred element whose selection is thus indicated being an element other than a form element;

providing the processor with a second document image comprising digital image data including a second plurality of pixels, the second document image being selected from among a plurality of document images and representing the reference document without the mark;

with the processor, automatically extracting from the first document image a set of pixels representing the mark by performing a reference-based mark extraction technique wherein the second document image serves as a reference image, the technique comprising at least one image-domain operation for comparing the first and second document images, the image-domain operation being an image processing operation carried out without recognition by the processor of any symbolic content in either of the first or second document images;

providing the processor with information about a set of active elements of the reference document, each active element being one element among the plurality of elements of the reference document, the reference document having at least one such active element, each active element being associated with at least one action;

interpreting with the processor the extracted set of pixels representing the mark, thereby determining whether the preferred element whose selection is indicated by the mark is an active element of the reference document; and if the preferred element is thus determined to be an active element, facilitating with the processor the action with which the preferred element is associated.

16. The method of claim 15 in which the first providing step comprises providing the processor with a first document image wherein the selected element is an element other than a form element selected from the group consisting of:

a substantially blank region having a perimeter delimited at least in part by a perimetral boundary and within which blank region a substantial portion of the mark is disposed;

a substantially blank region substantially underscored by a baseline proximate to which baseline a substantial portion of the mark is disposed;

a textual word located in an array of textual words set apart from any surrounding text, the mark being proximate to the textual word; and a graphical symbol located in an array of graphical symbols set apart from any nearby nonblank elements, the mark being proximate to the graphical symbol.

17. A method comprising the steps of:

scanning a hardcopy instance of a first document with a digital scanning device to produce a first document image comprising digital image data including a first plurality of pixels, the hardcopy instance being an instance of a reference document to which instance a mark has been added, the reference document having a plurality of elements, the reference document being a hypertext document having an associated set of active elements, each active element being associated with at least one action;

providing a processor with the first document image;

providing the processor with a second document image comprising digital image data including a second plurality of pixels, the second document image being selected from among a plurality of document images and representing the reference document without the mark;

providing the processor with the set of active elements for the reference document;

with the processor, automatically extracting from the first document image a set of pixels representing the mark by performing a reference-based mark extraction technique wherein the second document image serves as a reference image and wherein substantially the entirety of the first document image is compared with substantially the entirety of the second document image;

interpreting with the processor the extracted set of pixels representing the mark by determining whether any of the active elements of the reference document is indicated by the mark; and if an active element is indicated by the mark, facilitating with the processor the action with which such active element is associated.

18. The method of claim 17 wherein:

the step of providing the processor with the second document image comprises rendering a representation of the second document, the representation being expressed in a language for expressing hypertext documents; and the step of providing the processor with the set of active elements comprises obtaining information about the set of active elements from said representation of the second document.

19. The method of claim 17 wherein:

at least one action with which each active element is associated is an action of following a specified hypertext link; and the facilitating step, if performed, comprises initiating a traversal of the specified hypertext link.

20. An article of manufacture comprising an information storage medium wherein is stored information comprising a software program for facilitating the steps of:

providing a processor with a first document image comprising digital image data including a first plurality of pixels, the first document image representing an instance of a reference document to which instance a mark has been added, the reference document having a plurality of elements;

providing the processor with a second document image comprising digital image data including a second plurality of pixels, the second document image being selected from among a plurality of document images and representing the reference document without the mark;

with the processor, automatically extracting from the first document image a set of pixels representing the mark by performing a reference-based mark extraction technique wherein the second document image serves as a reference image and wherein substantially the entirety of the first document image is compared with substantially the entirety of the second document image;

providing the processor with information about a set of active elements of the reference document, each active element being one element among the plurality of elements of the reference document, the reference document having at least one such active element, each active element being associated with at least one action;

interpreting with the processor the extracted set of pixels representing the mark by determining whether any of the active elements of the reference document is indicated by the mark; and if an active element is indicated by the mark, facilitating with the processor the action with which such active element is associated.

* * * * *